(12) United States Patent
Han et al.

(10) Patent No.: US 11,064,330 B2
(45) Date of Patent: Jul. 13, 2021

(54) METHODS FOR ENABLING DELAY-AWARENESS IN THE CONSTRAINED APPLICATION PROTOCOL (COAP)

(71) Applicant: Convida Wireless, LLC, Wilmington, DE (US)

(72) Inventors: Yanyan Han, Lafayette, LA (US); Chonggang Wang, Princeton, NJ (US); Xu Li, Plainsboro, NJ (US); Zhuo Chen, Claymont, DE (US); Lijun Dong, San Diego, CA (US); Guang Lu, Thornhill (CA); Quang Ly, North Wales, PA (US); Shamim Akbar Rahman, Cote St. Luc (CA)

(73) Assignee: Convida Wireless, LLC, Wilmington, DE (US)

( * ) Notice: Subject to any disclaimer, the term of this patent is extended or adjusted under 35 U.S.C. 154(b) by 83 days.

(21) Appl. No.: 15/535,592

(22) PCT Filed: Dec. 17, 2015

(86) PCT No.: PCT/US2015/066308
§ 371 (c)(1),
(2) Date: Jun. 13, 2017

(87) PCT Pub. No.: WO2016/100631
PCT Pub. Date: Jun. 23, 2016

(65) Prior Publication Data
US 2017/0373804 A1    Dec. 28, 2017

Related U.S. Application Data

(60) Provisional application No. 62/092,865, filed on Dec. 17, 2014.

(51) Int. Cl.
*G06F 15/16* (2006.01)
*H04W 4/70* (2018.01)
(Continued)

(52) U.S. Cl.
CPC ............ *H04W 4/70* (2018.02); *G06F 1/3234* (2013.01); *H04L 1/1678* (2013.01);
(Continued)

(58) Field of Classification Search
CPC ........ H04B 10/116; H04W 4/70; H04W 4/38; G06F 1/3234; H04L 1/1887; H04L 67/04; H04L 67/325; H04L 69/329
(Continued)

(56) References Cited

U.S. PATENT DOCUMENTS

2003/0023738 A1*   1/2003   Boivie ................ H04L 12/1886
                                                        709/230
2005/0243761 A1    11/2005   Terry et al.
(Continued)

FOREIGN PATENT DOCUMENTS

DE    202005006884 U1   9/2005
WO    2005/065261 A2    7/2005
(Continued)

OTHER PUBLICATIONS

Shelby, "The Constrained Application Protocol (CoAP)", RFC 7252, pp. 1-111, Jun. 2014.*
(Continued)

*Primary Examiner* — Oscar A Louie
*Assistant Examiner* — Messeret F Gebre
(74) *Attorney, Agent, or Firm* — BakerHostetler

(57) ABSTRACT

A Delay Indicator parameter is contained in CoAP messages to reflect delay tolerance information. The Delay Indicator is leveraged by CoAP Clients and CoAP Servers to improve their behavior such as entering sleep mode to save energy
(Continued)

while not violating delay requirements. A timeout mechanism for CoAP Response is enabled by a RESPONSE_Timer based on the Delay Indicator in CoAP ACK. Cancellation of CoAP Requests is enabled by leveraging the delay tolerance information as indicated by Delay Indicator.

20 Claims, 27 Drawing Sheets

(51) Int. Cl.
G06F 1/3234 (2019.01)
H04L 1/16 (2006.01)
H04L 1/18 (2006.01)
H04L 29/08 (2006.01)
H04W 4/38 (2018.01)

(52) U.S. Cl.
CPC ............ *H04L 1/1887* (2013.01); *H04L 67/04* (2013.01); *H04L 67/325* (2013.01); *H04L 69/329* (2013.01); *H04W 4/38* (2018.02); *Y02D 30/70* (2020.08)

(58) Field of Classification Search
USPC .................................................. 709/217, 232
See application file for complete search history.

(56) References Cited

U.S. PATENT DOCUMENTS

| | | | | |
|---|---|---|---|---|
| 2008/0192820 A1* | 8/2008 | Brooks | .............. | H04N 7/17318 375/240.02 |
| 2009/0063681 A1* | 3/2009 | Ramakrishnan | ... | H04N 7/17318 709/225 |
| 2010/0153505 A1* | 6/2010 | Oh | ....................... | G06Q 10/107 709/206 |
| 2010/0318667 A1* | 12/2010 | Miller | ..................... | H04L 67/02 709/228 |
| 2012/0151028 A1* | 6/2012 | Lu | ........................... | H04W 4/18 709/223 |
| 2013/0051293 A1* | 2/2013 | Wentink | ............ | H04W 52/0216 370/311 |
| 2013/0163491 A1* | 6/2013 | Singh | ................ | H04W 52/0216 370/311 |
| 2014/0057670 A1* | 2/2014 | Lim | ...................... | H04W 8/005 455/509 |
| 2014/0067902 A1* | 3/2014 | Wang | ..................... | H04L 67/02 709/201 |
| 2014/0204793 A1* | 7/2014 | Ben-Haim | ............ | H04W 24/00 370/253 |
| 2014/0211680 A1* | 7/2014 | Seok | ................. | H04W 52/0216 370/311 |
| 2015/0036572 A1* | 2/2015 | Seok | ................. | H04W 52/0216 370/311 |
| 2015/0099555 A1* | 4/2015 | Krishnaswamy | ....... | H04W 4/70 455/509 |
| 2016/0105500 A1* | 4/2016 | Anchan | ............... | H04L 67/1051 370/329 |
| 2016/0112981 A1* | 4/2016 | Ahn | ........................ | H04W 4/70 455/500 |
| 2016/0150537 A1* | 5/2016 | Jung | ....................... | H04W 4/80 455/452.1 |

FOREIGN PATENT DOCUMENTS

WO 2011/159985 A1 12/2011
WO 2014/024002 A1 2/2014

OTHER PUBLICATIONS

K.Li., "CoAP Option Extension: Patience draft-li-core-coap-patience-option-05", Oct. 24, 2014 (Year: 2014).*
X. Wen, "Low-Power Testing for Low-Power Devices," 2010 IEEE 25th International Symposium on Defect and Fault Tolerance in VLSI Systems, Kyoto, Japan, 2010, pp. 261-261.*
Ionescu, A. M., De Michielis, L., Dagtekin, N., Salvatore, G., Cao, J., Rusu, A., & Bartsch, S. (2011). Ultra low power: Emerging devices and their benefits for integrated circuits.*
S. Tozlu, M. Senel, W. Mao and A. Keshavarzian, "Wi-Fi enabled sensors for internet of things: A practical approach," in IEEE Communications Magazine, vol. 50, No. 6, pp.*
A. Sehgal, V. Perelman, S. Kuryla and J. Schonwalder, "Management of resource constrained devices in the internet of things," in IEEE Communications Magazine, vol. 50, No. 12, pp. 144-149.*
Shelby, IETF RFC 6690—Constrained RESTful Environment (CoRE) Link Format, Aug. 2012, 23 pages.
Shelby et al., "Constrained Application Protocol (CoAP); Draft-IETF-CORE-COAP-00", Internet Engineering Task Force, IETF, Jun. 7, 2010, pp. 1-30.
OneM2M-TS-0001-OneM2M Functional Architecture V0.8.0_ Aug. 2014, 297 pages.
Hartke, Observing Resources in CoAP, draft-ietf-core-observe 13, Apr. 2014, 33 pages.
Hartke, IETF draft Hartke Core Coap Liveliness—00, tools, Jul. 2013, 8 pages.
Fielding, IETF RFC 2616, Hypertext Transfer Protocol (HTTP/1.1), Jun. 1999, 165 pages.
Constrained RESTful Environments WG (Core), IETF 89 Proceedings, Jul. 2014, 115 pages.
Bormann, Blockwise Transfers in CoAP, draft-ietf-core-block-14, Oct. 2013, 32 pages.

* cited by examiner

| Version | Type | TKL0 | Code | Message ID |
|---|---|---|---|---|
| Token ID0 | TKL1 | Token ID1 | TKL2 | Token ID2 |
| Option ||||||

| 11111111 | Payload0 |
|---|---|
| Option delta | Option length |
| Option value (Payload1) ||
| Option delta | Option length |
| Option value (Payload2) ||
| DIFP Option ||

FIG. 18

| CoAP Header ||||
|---|---|---|---|
| Payload0 ||||
| Option delta ||| Option length |
| TKL1 | Token ID1 || Payload1 |
| Option delta ||| Option length |
| TKL2 | Token ID2 || Payload2 |
| DIFP Option ||||

FIG. 19

| Version | Type | TKL | Code | Message ID0 |
|---------|------|-----|------|-------------|
| Token ID0 ||||||
| Option ||||||
| 11111111 | Payload0 ||||
| 11111111 | Payload1 ||||
| 11111111 | Payload2 ||||
| Option delta | Option length | Token ID1 |||
| Option delta | Option length | Token ID2 |||
| DIFP Option ||||||

FIG. 20

| CoAP Header |||
|---|---|---|
| Option delta | Option length | Message ID1 |
| Option delta | Option length | Message ID2 |
| DIFA Option |||

FIG. 21

| Version | Type | TKL | Code | Message ID0 |
|---------|------|-----|------|-------------|
| Message ID1 | Message ID2 | | | |
| DIFA Option |||||

FIG. 22

| Option delta | Option length |
|--------------|---------------|
| Option value (Token ID) ||

FIG. 23

METHODS FOR ENABLING DELAY-AWARENESS IN THE CONSTRAINED APPLICATION PROTOCOL (COAP)

This application is a National Stage Application filed under 35 U.S.C. § 371 of International Application No. PCT/US2015/066308, filed Dec. 17, 2015, which claims priority to U.S. Provisional Patent Application No. 62/092,865, filed Dec. 17, 2014, the disclosure of which is incorporated herein by reference in its entirety.

BACKGROUND

The Constrained Application Protocol (CoAP) is a simple software protocol that allows electronic devices to communicate over the Internet. CoAP is particularly useful for small low power sensors, switches and other components that are to be controlled remotely using standard internet networks.

FIG. 1 is a diagram that illustrates CoAP modelled as a two-layer protocol where the message layer 102 deals with the message exchange through UDP between endpoints, while the Request/Response layer 104 manages the detailed interaction by defining methods and Response codes. Similar to HTTP, but different from The Hypertext Transfer Protocol (HTTP), the Request/Response manner is asynchronous by optionally employing a separate Response whenever the server has obtained the required data and is ready to transmit.

There are four basic message types in CoAP: Confirmable (CON), Non-confirmable (NON), Acknowledgement (ACK) and RESET. The first two differ in that a CON message always requires an ACK while a NON message does not. ACK is a 4-byte message to indicate the successful reception of a CON message. RESET is also a 4-byte message to indicate the received message cannot be recognized or fulfilled.

CoAP uses CON and NON to meet different reliability demands. Only CON message can trigger the reliability option through a retransmission mechanism. FIG. 2 is a diagram that illustrates a typical messaging process with a separate Response.

On receiving a CON Request, CoAP Server 202 must acknowledge the successful reception by replying with an ACK. The ACK can be either empty or piggybacked with the Response. The former indicates an asynchronous transmission since the Response will be sent some time later than ACK. The latter implies that the Response is sent immediately with ACK in a synchronous manner. Should CoAP Client 204 not receive the ACK within an ACK timer (i.e., ACK_Timer in FIG. 2), it will retransmit the Request using an exponential back-off algorithm and double the ACK timer to wait for CoAP Server's Response. If receiving a NON Request, CoAP Server 202 does not need to send an ACK and CoAP Client 204 does not need to enable an ACK_Timer. Rather, it only sends the Response whenever it gets the required data.

There are some limited cancellation features that may be used with CoAP outside of the core CoAP protocol. In one, a Client can use a CON Request to cancel a previous Request; the CON Request will contain the same Token ID and a special Code is to indicate this is a cancel Request so that the Server can recognize it. In case the Server crashes or bootstraps, it can not recognize it and will send a RESET back to the Client 204. Upon receiving the RESET, the Client knows the Server will not process the previous Request and complete the cancel process. However, there is no indication for the Client 204 to decide when to send the cancel Request. It is possible that the Server 202 is in the middle of transmitting the Response when the Client 204 is sending a cancel Request, making the cancellation void. In addition, some cancellation methods are specifically targeted for the CoAP observe and may not be applicable to general CoAP Requests.

CoAP has four basic methods to support the communication between endpoints: GET, PUT, POST and DELETE, each of which has similar functionality with corresponding HTTP methods. A CoAP Server maintains a list of available resources that can be accessed by CoAP Clients either through multicast CoAP addresses or by obtaining a URI referenced to the resource.

FIG. 3 is a diagram that shows a CoAP message format. CoAP message format starts with a fixed-size 4-byte header, followed by a variable-length Token value which can be between 0 and 8 bytes long, the length of which is indicated by ToKen Length (TKL). Next a sequence of zeroes or additional CoAP Options in Type-Length-Value (TLV) format, optionally follows a payload which makes up the rest of the datagram Specially, Message ID is used in ACK or RESET message to match a CON Request thus enabling duplicate detection. Whereas, Token ID is used in Response to match a Request within a transaction. FIG. 4 is a diagram that illustrates the CoAP Option format.

CoAP also supports making Requests to an IP Multicast group. CoAP endpoints that offer services that they want others to find using multicast service discovery, can join appropriate All-CoAP-Nodes multicast addresses. In the Request, the multicast address is used instead of a CoAP unicast endpoint address and it must be a NON message.

CoAP Proxy is an endpoint that can be tasked by CoAP Clients to perform Requests on their behalf (i.e., forward proxy). This may be useful, for example, when the Request could otherwise not be made, or to service the Response from a cache in order to reduce Response time and network bandwidth or energy consumption. If CoAP Proxy has a cache which stores the Response requested by a CoAP Client (i.e., reverse proxy), then it can respond immediately without contacting the CoAP Server. Otherwise, it has to forward the Request to the CoAP Server. Similarly, the ACK and Response from the CoAP Server will be forwarded immediately back to CoAP Client.

SUMMARY

According to one aspect disclosed herein, in a delay-aware CoAP messaging model, a DelayIndicator parameter may be contained in CoAP messages to reflect delay tolerance information. Furthermore, the DelayIndicator may be leveraged by CoAP Clients and CoAP Servers to improve their behavior such as entering sleep mode to save energy while not violating delay requirements.

According to another aspect, the timeout mechanism for CoAP Response may be enabled by a RESPONSE_Timer based on the DelayIndicator in CoAP ACK.

According to yet another aspect, delay-enabled multicasting of CoAP Responses may allow for multiple CoAP Clients to request the same resource. A CoAP Server may take their Requests into consideration, aggregate corresponding Responses, and multicast the aggregated Response to the CoAP Clients.

In another aspect, CoAP Requests may be cancelled by leveraging the delay tolerance information as indicated by the DelayIndicator parameter.

In still a further aspect, new CoAP message formats may include new CoAP options to support Delay-Awareness.

This Summary is provided to introduce a selection of concepts in a simplified form that are further described below in the Detailed Description. This Summary is not intended to identify key features or essential features of the claims subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF DRAWINGS

A more detailed understanding may be had from the following description, given by way of example in conjunction with the accompanying drawings wherein:

FIG. 18 is a diagram that illustrates one embodiment of an aggregated response.

FIG. 19 is a diagram that illustrates a second embodiment of an aggregated response.

FIG. 20 is a diagram that illustrates a third embodiment of an aggregated response.

FIG. 21 is a diagram that illustrates a first embodiment of an aggregated ACK.

FIG. 22 is a diagram that illustrates a second embodiment of an aggregated ACK.

FIG. 23 is a diagram that illustrates an example of a cancel option.

DETAILED DESCRIPTION

Figure 5:
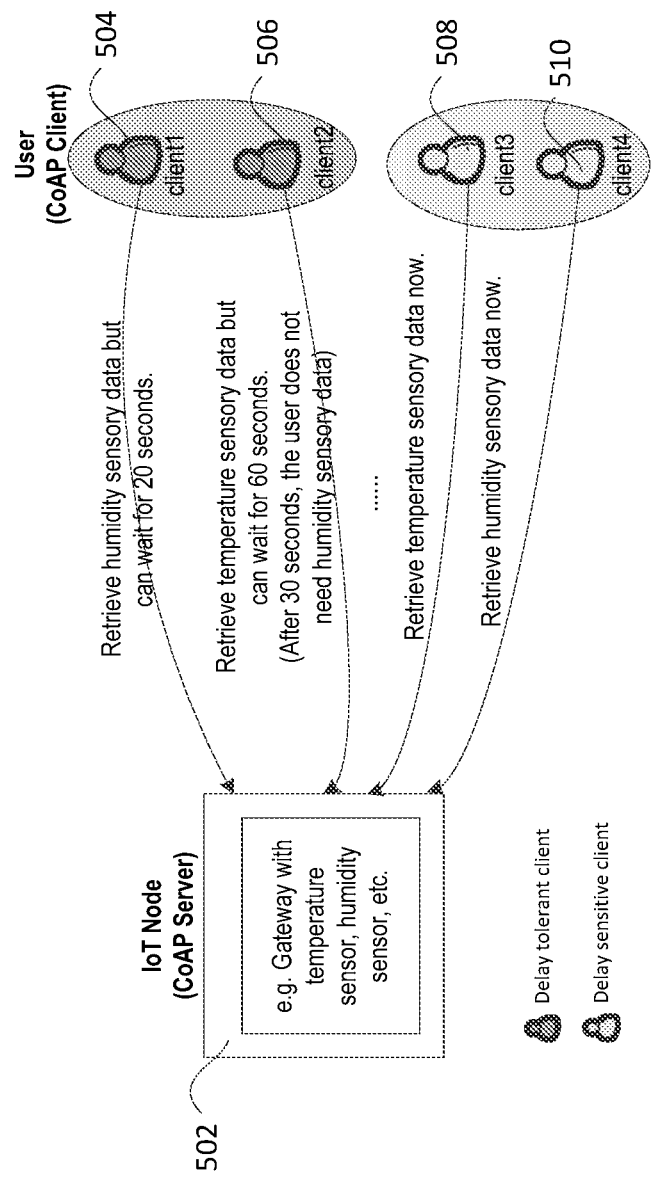
FIG. 5 is a diagram that illustrates a scenario including an IoT Node and a user.

Existing web applications usually attempt to retrieve data in a real-time manner. In contrast, Internet of Things (IoT) applications could be delay-tolerant; in other words, IoT users may request to get sensory data with certain delay tolerance. FIG. 5 is a diagram that illustrates a scenario including an IoT Node 502 (i.e. CoAP Server) and a user 504, 506, 508, and 510 (i.e. CoAP Client). The IoT Node 502 (which can be an IoT device, IoT gateway, IoT proxy or a sensor node) has a temperature sensor and a humidity sensor. The user needs to retrieve sensor readings from the IoT Node. In this use case, the user may have the following two requirements on retrieving sensor readings: Delayed Data Retrieval and Cancelling previous Requests.

For delayed data retrieval, different from normal retrieval operation, the user does not need to get an immediate Response from the IoT node, rather it can wait for certain time or delay tolerance (i.e. 20 seconds for client1). For example, in a building monitoring project, the client just needs to acquire the basic temperature data several times in a day, which is delay tolerant since there is no big difference to get the data now or 60 seconds later. However, for another user, it may require the immediate Response. For instance, when a fire accident occurs in a building, in order to quickly determine the location of the fire, the client needs the temperature and humidity sensory data immediately, which is delay sensitive For cancelling previous requests, in one example, after 30 seconds, Client2 determines it does not need the humidity sensory data and decides to cancel the previous Request to avoid useless Responses, especially when the Response payload is significant.

In addition, another use case is environment monitoring where most devices are energy-harvesting sensor nodes with long sleep cycles in order to reduce energy consumption and extend network lifetime, etc. Under this scenario, the user can tolerate certain delay before receiving the data. Also, it will go to sleep before receiving the data for energy conservation. The explicit delay requirement is critical to help constrained devices reserve power.

In the example shown in FIG. 5, the user 504 or 506 can tolerate certain delay in getting the Response from the IoT node 502, which could be leveraged by both the user 504 or 506 and the IoT node 502 (i.e., sleeping schedule). In addition, even if the user 504 or 506 does not indicate the delay tolerance, the IoT node 502 can tell the user the Response will be postponed for a certain time. This is especially useful in applications where IoT nodes 502 have low duty cycles.

Currently, CoAP does not support such delay tolerance for CoAP Client's Request or CoAP Server's Response. Even though CoAP supports separate (i.e. asynchronous) Response, it does not enable explicit delay-awareness as demonstrated above. Due to the absence of this support, a CoAP Server cannot distinguish the diverse delay requirements from different clients (or different Requests from a single client). Eventually the clients with urgent data demand (or delay sensitive clients) may be served much later than those with loose data demand (or delay tolerant clients), or the Response is lost due to traffic congestion or Server processing congestion (e.g., CoAP Server can only service 3 clients/second). Either scenario will lead to degraded performance. Explicit delay requirement provides the opportunity for endpoints to make better and flexible schedule regarding the sleeping/awake mode switch, also for the CoAP Server to make better data delivery plan for different CoAP Clients and possible data aggregation for the same CoAP Client, etc. However, the existing CoAP protocol does not support this feature.

Although oneM2M already has the concept of an expiration timestamp, the Delay Awareness is still needed in case there is no Service Layer support at IoT Node (i.e., IoT Proxy, IoT Gateway or IoT device). It is better that the application layer has this independent functionality without heavy relying on other layers.

As shown in the example of FIG. 5, Client2 506 indicates the delay tolerance in the data Request. But prior to receiving Response back from the IoT node 502, it determines that the humidity sensory data is not needed any more. As such, the user could ask the IoT node 502 to cancel the previous Request. This is a typical need especially when the Request has some delay tolerance before actually being executed by CoAP Server 502. Request cancellation, can leverage the critical delay requirement to decide the time of issuing the cancellation. The delay aware Request cancellation can not only avoid the CoAP Server 502 performing unwanted actions and thus reducing the traffic resulting from the Request, which is critical for IoT devices; but also leverage the delay requirement from CoAP Client, enabling more intelligent operations.

Figure 6:
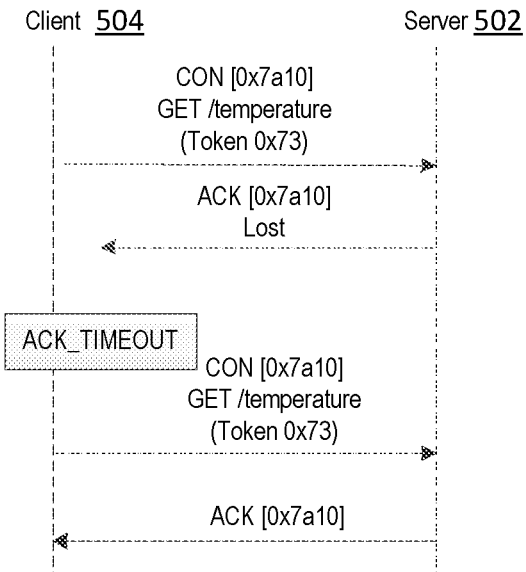
FIG. 6 is a diagram that illustrates ACK timeout in CoAP due to the loss of ACK.

FIG. 6 is a diagram that illustrates a delay timeout for ACK in CoAP. Existing CoAP supports a timeout mechanism, however, only for ACK. If the timer expires, then retransmission of the CON message will be launched as shown For example, after the arrival of ACK, the CoAP Client 504 cancels the ACK_TIMEOUT and waits for the Response. If the Response is a CON message sent by CoAP Server 502, then CoAP Server 502 will expect an ACK for the Response. Once this ACK_TIMEOUT expires, CoAP Server 502 will retransmit the CON Response. However, if server crashed, or had some fault in processing and was unable to send the Response, the CoAP Client 504 has no clue about the arrival time of the Response. The situation is even worse for a NON Response because there is no expected ACK to CoAP Server 502 for the Response and CoAP Server 502 will never retransmit the Response. Therefore, due to lack of efficient Response timer in existing CoAP protocol, CoAP Client 504 can do nothing but retransmit the Request until achieving the MAX_RETRANSMIT (for both CON and NON Request). In CoAP specification, it only mentioned that the Requester may want to set up a timer not related to CoAP's retransmission timers in case the server is destroyed. However, there is no discussion or efficient mechanism to support the Response timer.

The following describes three ways of operating. The first way is to enable delay-awareness in CoAP protocol by containing/indicating delay information in CoAP messages to improve the behaviors of CoAP Server and CoAP Client, the second way is about leveraging delay information to multicast CoAP Responses to multiple CoAP Clients to improve performance the third way is to exploit delay information to enable CoAP Request cancellation. To support Delay Awareness, new CoAP options are also described.

In a Delay Aware CoAP Messaging Model, delay tolerance can be indicated in a CoAP Request, CoAP ACK, and CoAP Response messages to facilitate efficient interactions between CoAP Client 504 and CoAP Server 502. CoAP Client 504 and CoAP Server 502 can adapt their behaviors according to the indicated delay tolerance, for instance, to stay in sleeping mode to save energy. The motivation for such a delay tolerance aware Request could be that the CoAP Client 504 does not need the data for now, but wants to issue the Request in advance. A delay tolerance aware Request rather than a normal Request after 20 seconds may be sent if the CoAP Server 502 is too overloaded to be able to send the Response immediately. Alternately, there may be a potential bandwidth limitation or overcrowded channel occupancy at the time when issuing the Request can take place so that the Response may get lost. Therefore, delay tolerance provides more flexibility to CoAP Server for better Response scheduling.

With such delay tolerance information from various Clients (e.g. CoAP Client 504), Server (e.g. CoAP Server 502) can prioritize different Clients and have more intelligence to serve them. For example, Server 504 can first serve Clients 508 and 510 with shorter delay tolerance while sending tardy Response to other Clients with longer delay tolerance.

Figure 7:
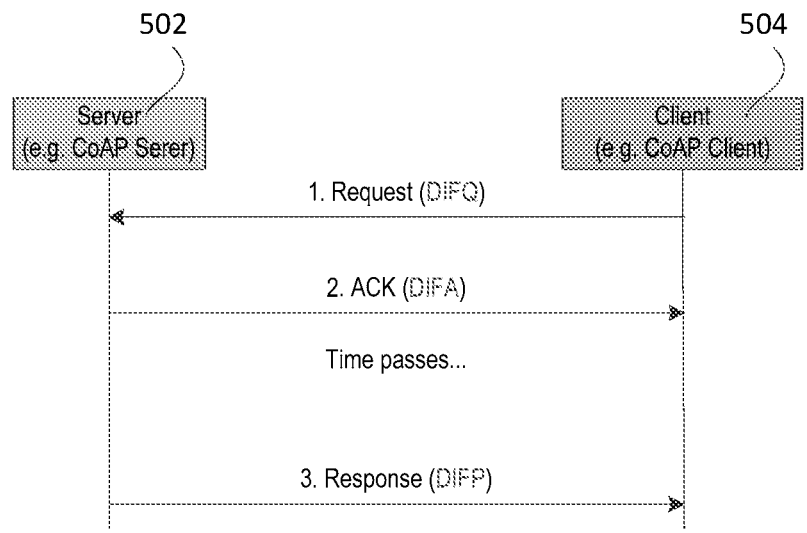
FIG. 7 is a flow diagram that shows an exemplary method of delay for CoAP messages of one embodiment.

FIG. 7 is a flow diagram that shows an exemplary method of delay for CoAP messages of one embodiment.

In step 1 of FIG. 7 Client 504 sends a Request message to Server 502, which may contain a new DelayIndicator For Request (DIFQ) or a flag indicating that it is delay tolerant.

DIFQ indicates the delay tolerance at the Client. In other words, Client 504 tells Server 502 that it can tolerate certain amount time delay (represented by DelayIndicator DIFQ) in receiving the Response back from the Server, e.g., DIFQ=20 seconds in the example of FIG. 5. DIFQ can also indicate a specific time for getting a sensor reading (i.e. the Client 504 requests to retrieve sensor readings generated at a specific time).

DIFQ can be an absolute/relative time value or an absolute/relative time range or just a flag indicating whether the Request is delay tolerant.

Absolute time can be the Client's time from its local clock, which can be in the form of GMT, i.e., Sun, 6 Nov. 2014 08:50:36 GMT as suggested in HTTP/1.1. Alternatively, it can be simplified to only include the time/date/month/year or time/date/month based on the application need.

Relative time for DIFQ can be the time difference from the Client's current sending time to the time when a Response from the Server 502 is expected to arrive.

For a relative time value, for example, DIFQ="30 seconds" can indicate that CoAP Client 504 can tolerate 30 seconds delay to receive the Response back from CoAP Server 502.

For a relative time range, DIFQ="[10 seconds, 30 seconds]" can indicate that CoAP Client 504 can tolerate a delay between 10 seconds and 30 seconds.

For consistency, it is preferred that only one time representation (absolute/relative) be adopted in a transaction and a mixed use is not allowed.

For a flag, only one bit is needed, by which 1 means delay-tolerant and 0 means delay-sensitive, or vice versa. For a delay tolerant Request, it is not mandatory to explicitly give a DIFQ. Rather, if without a DIFQ, it entails CoAP Server deciding the actual delay for returning the Response.

In step 2 of FIG. 7, Server 502 sends an ACK message to Client 504, which may contain a new parameter DelayIndicator For ACK (DIFA).

DIFA indicates the time duration before which the Server's Response will not be sent. In other words, using this parameter, Server 502 informs the Client 504 of the approximate arrival time of the incoming Response message, e.g., DIFA=15 seconds corresponding to the Request in Step 1. With DIFA from ACK, the Client 504 can optionally schedule itself to sleep for energy conservation. This is especially useful for IoT devices with extremely low duty cycle.

To make the Client 504 aware of the transmission time from the Server 502 to the Client 504, Server 502 can optionally attach a timestamp in the ACK to show the absolute time of sending the ACK besides DIFA. By comparing with its local time, the Client can estimate the transmission time of the ACK message, which can serve as an indication for the response transmission time. Thus the Client 504 knows that the expected Response may arrive some time later than the scheduled time due to the transmission time, which may affect its sleeping schedule.

If the Client 504 prefers another delay tolerance after issuing the current Request and having received the ACK, it can simply issue a new Request with the most up-to-date DIFQ before receiving the Response from the Server in FIG. 7. The new Request includes the same Token ID but different Message ID and DIFQ. The reason to use the same Token ID is to enable the Server 502 to keep the current transaction alive and avoid opening a new one. Besides, the Message ID should be larger than the old one as required in existing CoAP. The Server 502 will simply take the most up-to-date Request based on the larger Message ID and ignore the previous one before issuing the Response to the Client 504. Through this mechanism, the Client 504 and the Server 502 can intelligently negotiate an appropriate delay or latency for each request or multiple requests from the Client 504.

Consider the scenario that the Request is sent during the previous Request's Response delivery and then the Server 502 receives the new Request. For a NON Response, since the current transaction has ended and the new Request has the same Token ID, the Server just simply drops it. For a CON Response, the Server 502 will first keep the new Request until receiving the ACK for the CON Response from the Client 504. If the ACK timeout occurs, then the Server 502 can abandon the old Request and send another Response based on the new Request. Otherwise, the current transaction ends so the Server 502 simply drops the new Request.

If the Client 504 does not receive the ACK within ACK_TIMEOUT, it can retransmit a Request with the same Token ID and Message ID, but updated DIFQ, because some time has elapsed while waiting for the ACK.

For absolute time representation, DIFA is the timestamp when ACK is sent out; for relative time representation, DIFA is the time difference from the time the Server sends the ACK to the time that the Response will be sent out from the Server 504.

In step 3 of FIG. 7, Server 502 sends a Response message to CoAP Client, which may contain a new parameter DelayIndicator For Response (DIFP).

DIFP may indicate the actual delay in sending the Response message (i.e. the time from sending ACK message to sending the Response message or the absolute sending time) e.g., DIFP=16 seconds corresponding to above DIFQ and DIFA. Although the Client can know the actual message reception time itself, DIFP can be used by the Client to estimate the transmission time for the Response, i.e., the time difference from DIFP to the actual reception time at the Client 504. If the transmission time is large, it implies that the Server might be congested or there is traffic jam on the path from the Server 502 to the Client 504, thus the Client 504 can decide when to send the next Request more reasonably.

DIFP may also indicate the expected arrival time of next Request message. For example, if Server 504 does not want to receive too frequent requests from the Client 502, it can use this parameter to tell the Client 504 that the next Request should be issued after certain delay. Accordingly, another CoAP option NextReq can be created to enable this functionality. The Server 502 can adjust/control/regulate the arrival rate of Request messages from Client 504.

The option number can be an unreserved value such as 65.

The option length is the length of the option value.

The option value can be a time representation, either absolute or relative time similar to the DelayIndicator as illustrated in Step 1 of FIG. 7.

For a relative time representation, again, similar to ACK in Step 2 of FIG. 7, the Server 502 also can optionally attach a timestamp of sending this Response into Response message besides DIFP. Then the Client 504 can estimate the Response transmission time and notify Server 502 so that the Server 502 can take the transmission time into account when deciding the DIFA or DIFP for future Requests.

For absolute time representation, DIFA is the timestamp when Response is sent out; for relative time representation, DIFP is the time difference from the time stamp when ACK is sent out to the current sending time at the sender.

In one embodiment, in order to prevent the receiver from unnecessarily waiting for the expected Response due to Response failure, the disclosure presents a RESPONSE_Timer based on the DIFA attached in the ACK. It will be turned on whenever an ACK is received by CoAP Client 504. If no Response is received after RESPONSE_Timer expiring, the receiver is safe to terminate this transaction or fulfill the retransmission depending on its current interest. Fortunately, DIFA in ACK is a perfect timeout value for the RESPONSE_Timer because it is determined by CoAP Server. The reason why no specific timeout value is suggested as ACK_Timer (2 seconds by default in existing CoAP) is that it depends on the Request requirement and CoAP Server schedule to decide the time of sending the Response.

Take the same scenario in FIG. 7 as an example. From the ACK in Step 2 of FIG. 7, CoAP Client 504 learns that the Response will arrive after 20 seconds. If 20 seconds later (maybe a little longer than 20 seconds to accommodate possible late wakeup of CoAP Server 502), CoAP Client 504 does not receive the expected Response yet, it will assume the Response was lost or something is wrong with CoAP Server 502 thus no Response is sent. Consequently, if CoAP Client 504 is still interested in the resource, it can retransmit the Request or issue a new one as discussed in detail later. In either fashion, CoAP Client 504 can avoid useless waiting thus efficiently sparing its hardware resource (i.e., power and memory).

Figure 25A:
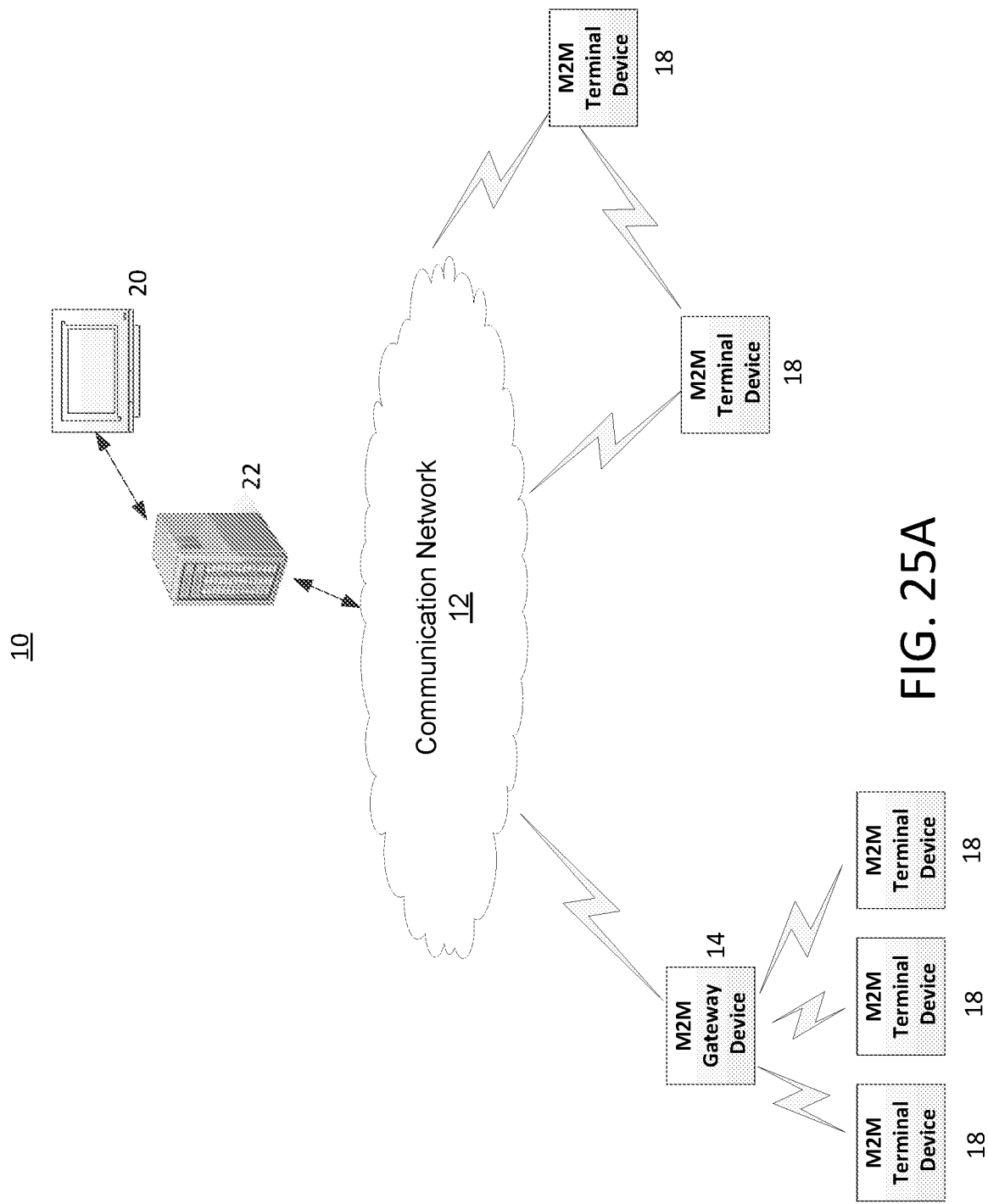
FIG. 25A is a diagram of an example machine-to machine (M2M), Internet of Things (IoT), or Web of Things (WoT) communication system in which one or more disclosed embodiments may be implemented.
Figure 25B:
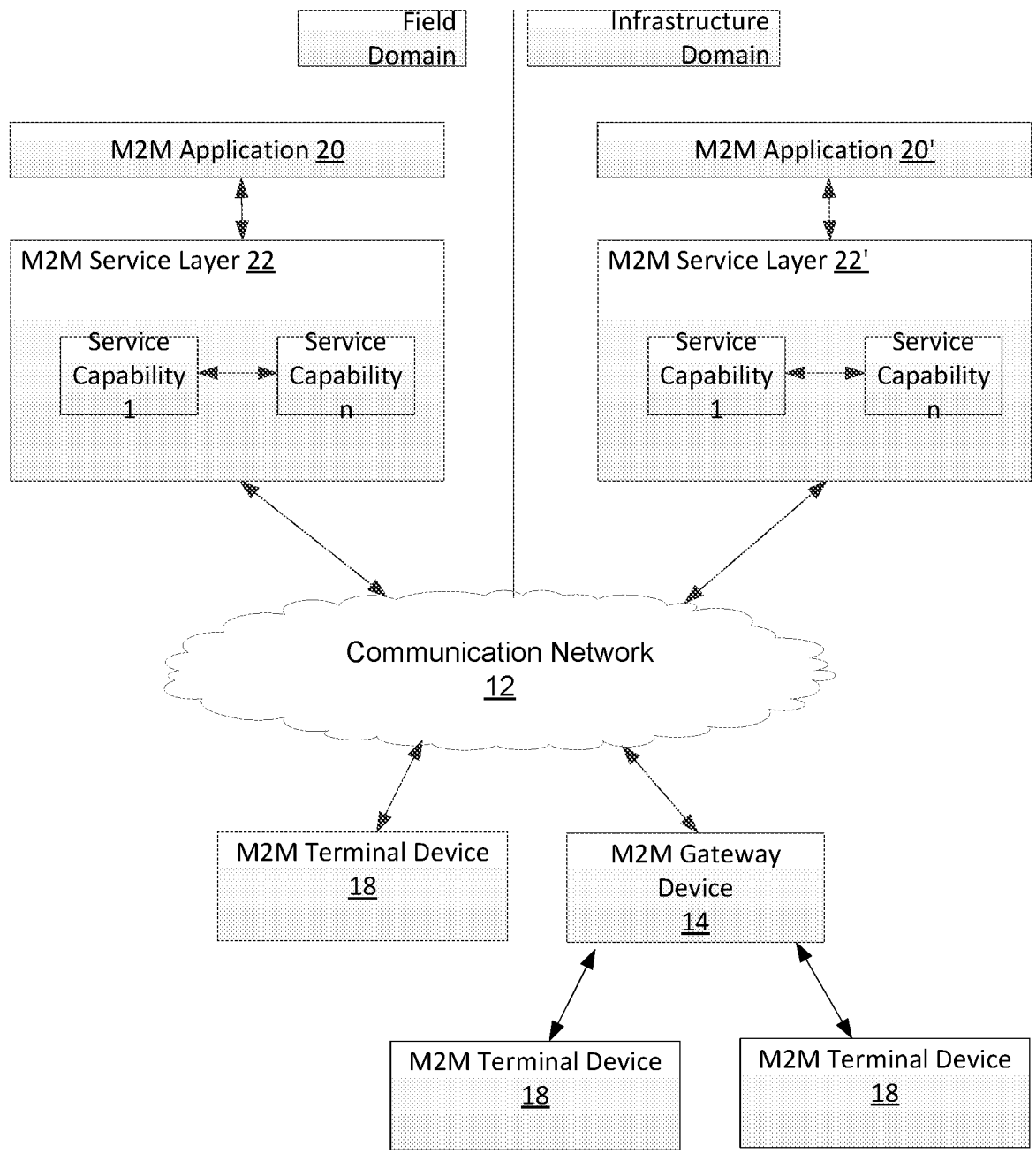
FIG. 25B is a diagram that illustrates an M2M service layer.
Figure 25C:
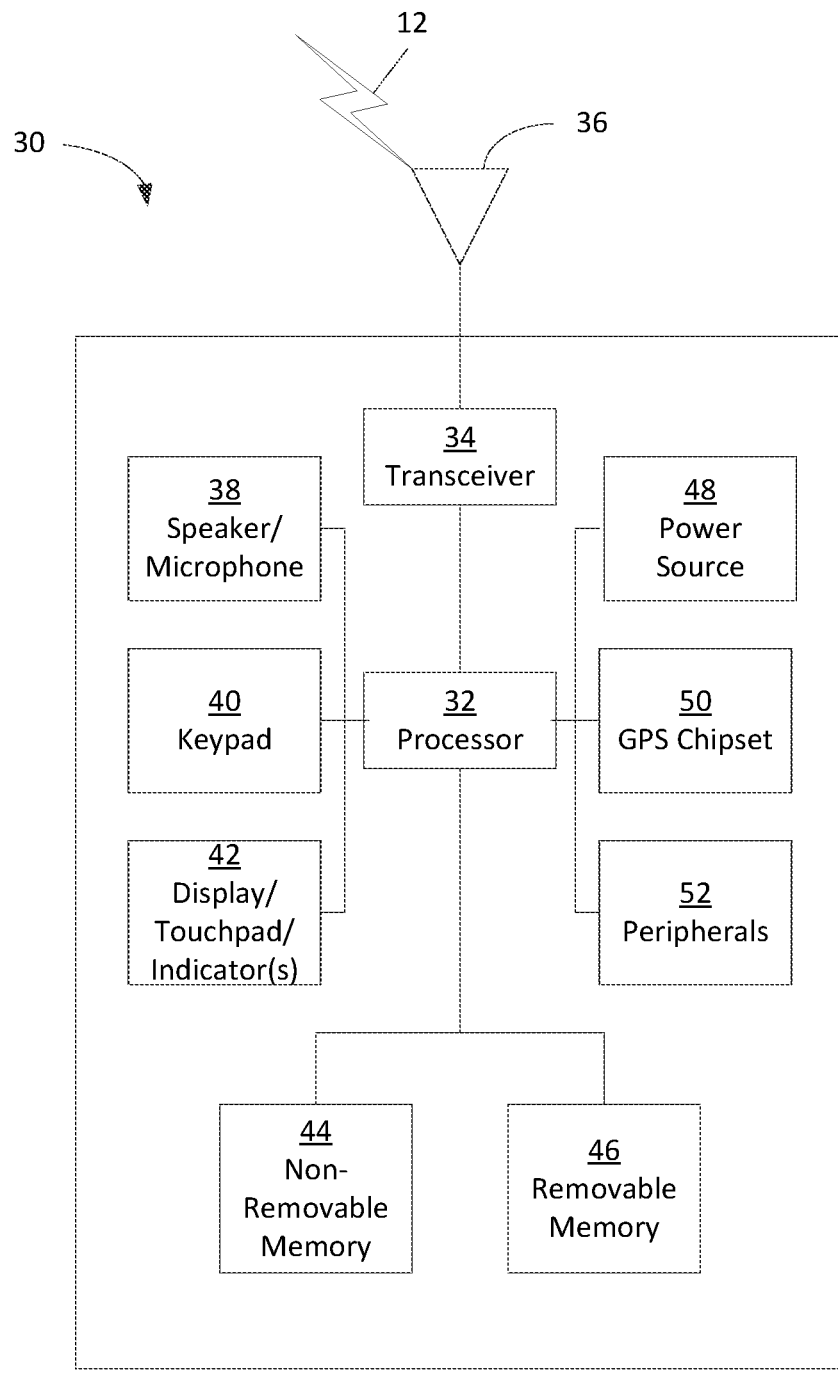
FIG. 25C is a block diagram of an example hardware/software architecture of a M2M network node.
Figure 25D:
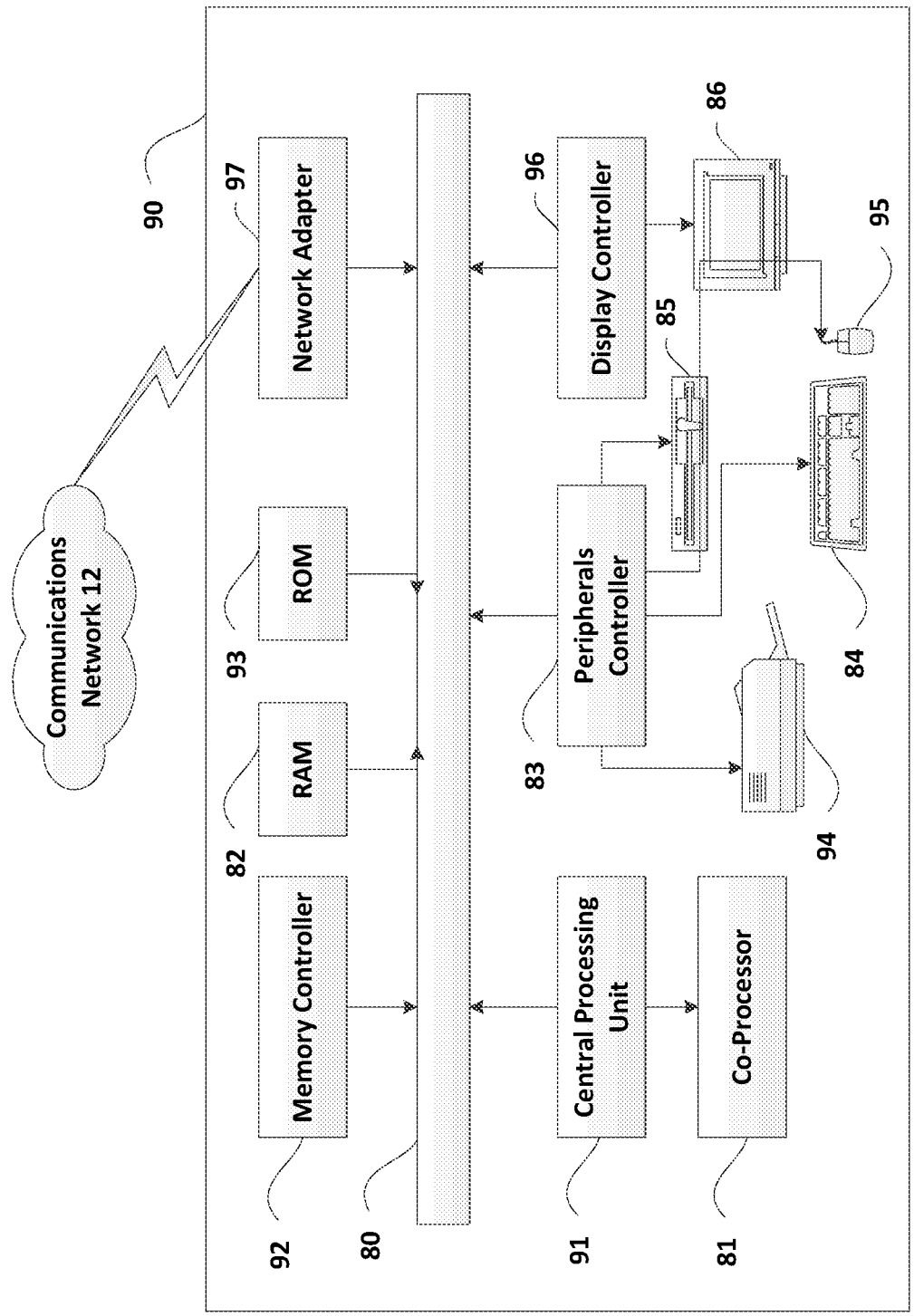
FIG. 25D is a block diagram of an exemplary computing system which may also be used to implement one or more nodes of an M2M network.

It is understood that the entities performing the steps illustrated in FIG. 7 are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIG. 7 may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIG. 7.

Figure 8:
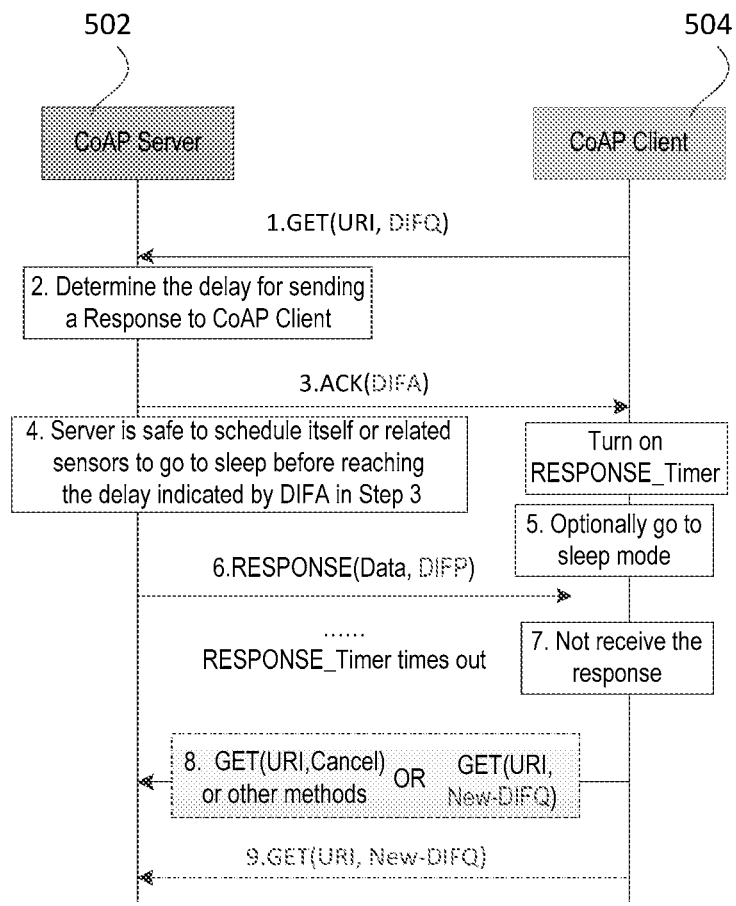
FIG. 8 is a flow diagram of a delay-enabled CoAP response timer method of one embodiment.

FIG. 8 is a flow diagram of a delay-enabled CoAP response timer method of one embodiment. FIG. 8 demonstrates the basic idea of this RESPONSE_Timer in assisting the receiver to recognize the failure of Response transmission. The detailed procedure is as follows:

In Step 1 of FIG. 8, CoAP Client 504 sends a GET Request to CoAP Server 502.

In Step 2 of FIG. 8, CoAP Server determines the delay (i.e. DIFA as contained in ACK in Step 3) for sending a Response to CoAP Client 504.

In Step 3 of FIG. 8, CoAP Server 502 sends an ACK to CoAP Client 504. The ACK contains a DIFA with a value as determined in Step 2.

In Step 4 of FIG. 8, CoAP Server 502 may schedule itself or related sensors to go to sleep according to DIFA contained in Step 3.

In Step 5 of FIG. 8, CoAP Client 504 receives the ACK and turns on the RESPONSE_Timer for the expected Response. It may go to sleep according to DIFA contained in ACK.

In Step 6 of FIG. 8, CoAP Server 502 sends the Response to CoAP Client 504. The Response may contain the actual delay or the delay for CoAP Client 504 to send next Request message by DIFP.

In Step 7 of FIG. 8, CoAP Client 504 waits for the Response until the RESPONSE_Timer times out. The Response does not successfully reach CoAP Client 504 maybe due to bad communication link or traffic jam. Then CoAP Client 504 realizes the Response failure.

In Step 8 of FIG. 8, CoAP Client 504 will take actions depending on whether it wants to terminate the current transaction.

If it does, then it needs to inform CoAP Server 502 to cancel the current transaction and get ready for a new one as the first option. This can be done by Cancellation operation. If the data is not needed any more, cancellation in Step 8 of FIG. 8 is the last step. If the data is still needed, then Step 9 is also done.

If it does not, then CoAP Client 504 prefers to keep the current transaction and is interested to get the data. It will issue another GET Request as in Step 1 of FIG. 8 but possibly with updated DIFQ because the current data requirement may have changed as the second option.

Since the previous GET Request has been acknowledged, the new one should use a new Message ID but the same Token ID as the current transaction is still alive.

In Step 9 of FIG. 8, if the Client 504 wants to terminate the current transaction, it may launch a new GET Request after cancelling the previous one. Obviously, the DIFQ is updated as well.

Since current transaction has been terminated, the new GET Request should use a new Message ID and Token ID.

For a CON Response from CoAP Server 502, the unsuccessful delivery to CoAP Client 504 will postpone the expected ACK from CoAP Client 504, thus the ACK timeout for the Response will trigger the retransmission of the Response to CoAP Client 504 till MAX_RETRANSMIT time is achieved. This mechanism does help CoAP Client 504 to receive the retransmitted Response. However, if CoAP Server 502 is too busy or temporarily crashes, this mechanism still leads CoAP Client 504 to extremely long (i.e., at most exhaust the maximal retransmissions) waiting, which is very inefficient and resource wasting for an IoT device. The RESPONSE_Timer works well for both CON and NON messages.

If there is a CoAP Proxy between CoAP Server 502 and CoAP Client 504, it needs to set up a local RESPONSE_Timer as well to act on behalf of CoAP Client 504. The function of the timer is similar to that at CoAP Client, i.e., in case that no Response is received, CoAP Proxy will retransmit the Request or issue a cancellation as needed.

It is understood that the entities performing the steps illustrated in FIG. 8 are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIG. 8 may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIG. 8.

Figure 9A:
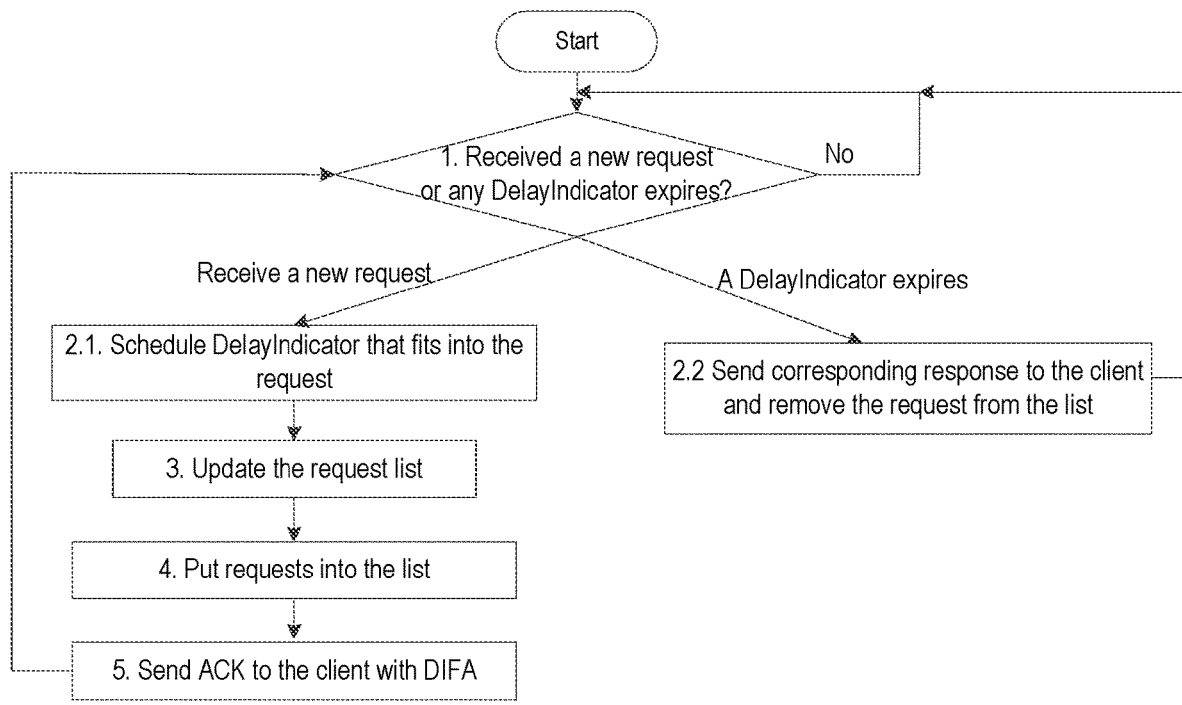
FIGS. 9A-B are diagrams that illustrate delay awareness support at CoAP Server and CoAP Client respectively.
Figure 9B:
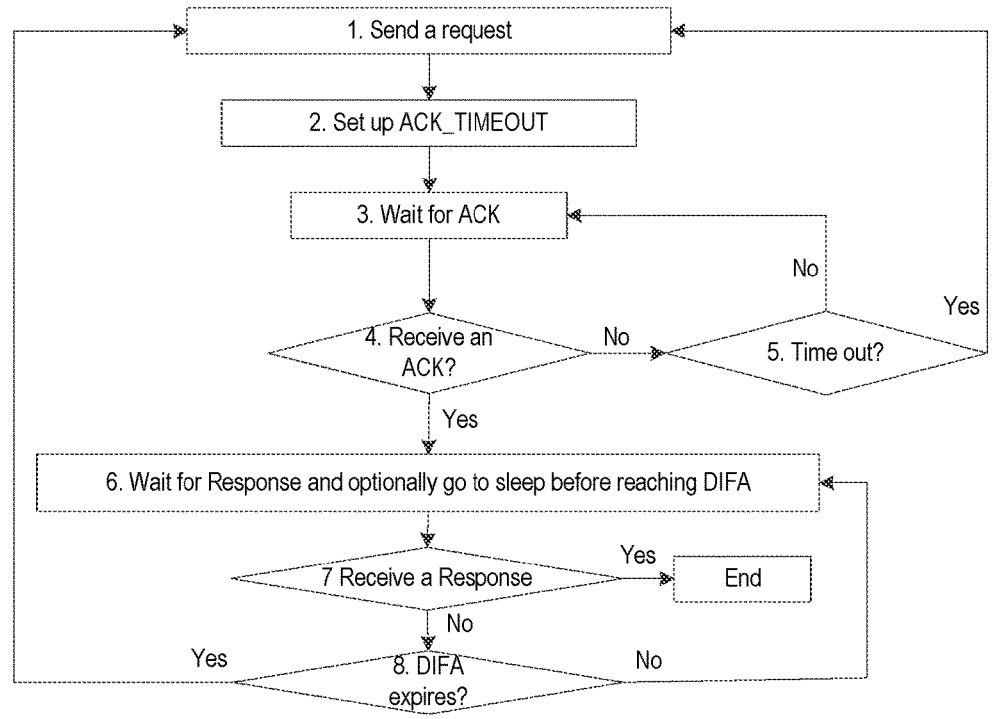

FIGS. 9A-B are diagrams that illustrate delay awareness support. To generalize Server and Client's behavior under Delay-Awareness support, the flow chart is presented in FIGS. 9A-B. FIG. 9A is a flowchart of a procedure at Server 502 and FIG. 9B is a flowchart of a procedure at Client 504. It deals with the scenario under multiple Delay-Aware Requests from Clients (might be different clients).

FIG. 9A shows the procedure that Server receives and services an incoming Request. Though many data structures can be applied to store the pending Request, "list" is adopted in this example (note that list can be a message queue as well). Assume only one Request list (i.e., it is used to store all pending Requests received by the server) is used in FIG. 9A, although the scenario under multiple lists will be discussed in the following steps.

In step 1 of FIG. 9A, the server waits for the incoming Requests and checks the DelayIndicator in the Request list.

In step 2.1 of FIG. 9A, the server receives a new Request. For the incoming Request, it schedules (i.e., calculates) the DelayIndicator (i.e., the time that the Response should be sent) that fits the Request based on DIFQ and inserts the Request into the Request list.

If DIFQ is a value, then the designated DelayIndicator (i.e., DIFA) should not be later than it.

If DIFQ is a range, then the designated DelayIndicator should be within it.

If there are already other scheduled Requests in the list, server has two options to make the schedule for incoming new Request.

The first option (i.e., Uninterruptible mode) is to keep the current schedules for pending Requests unchanged and find a proper schedule for the new Request while not violating the existing schedules.

The second option (i.e., Interruptible mode) is to allow modifying the current schedules for pending Requests in order to satisfy the requirement of this new Request. This may result from limited Responses the Server can handle per time such that if a time unit has been allocated a Response, it cannot handle another. If the modification occurs, it is possible for the Server to issue new ACKs for pending Request to tell new DIFA because of the interruption from the newly received Request. However, there should be a limit to modify current Request schedule for each client.

If DIFQ is a flag, the server may put it at the end of the list so that only other delay specific Request are completed, can this Request be processed.

In step 2.2 of FIG. 9A, Some DIFA expires. Server sends Response to the corresponding client and removes the Request from the Request list. Then, go back to Step 1 of FIG. 9A.

In step 3 of FIG. 9A, the server updates the Request by considering the elapsed time, i.e., the time difference from last time stamp until current time. If no Request list exists, Server creates a new one. Different strategies can be used for list management.

The first strategy is to maintain only one list storing all Requests. It can be a circular list and each element (i.e., Request) corresponds to a time, such as 1 second for the first Request and 2 seconds for the second Request. Whenever a new Request arrives, Server will change the corresponding time unit for each element by minus the elapsed time since last update from the old value, as demonstrated in the example shown in FIG. 10 A-D.

The second strategy is to maintain multiple lists and each list stores the Requests whose delay requirements are within certain time scale, as illustrated in the example of FIGS. 10 A-D.

The number of lists to be created and maintained depend on the granularity requirement for the scheduling and the time scale in each list. Moreover, the larger time scale in a list, the less accuracy (or fairness) guaranteed. For implementation preference, time scale in each list should be properly defined.

In step 4 of FIG. 9A, after the scheduling (i.e., calculation), the DelayIndicator for the Response corresponding to each Request has been determined. The server inserts the Request(s) into the Request list in chronologically increasing order according to the calculated DIFA values.

If there is only one list storing all Requests, then the Requests should be inserted in the increasing order of DIFA calculated in Step 2.1 of FIG. 9A. The server can always grab the first Request in the list and send Response to it.

In one embodiment, if there are multiple lists, more advanced list management can be applied. For example, for Requests satisfying the time scale in one list, they don't need to be strictly sorted according to their DelayIndicator; instead, they are inserted into the list according to their arrival time.

In step 5 of FIG. 9A, the server sends ACK with DIFA calculated in Step 2.1 of FIG. 9A to the client for the new Request. Then go back to Step 1 of FIG. 9A.

If the Uninterruptible mode is used in Step 2.1 of FIG. 9A, then the Server only needs to send ACK to the new incoming Request;

If the Interruptible mode is used in Step 2.1 of FIG. 9A, besides the ACK for the new Request, Server also has to resend the ACK for Requests whose schedule has been modified due to the new Request.

FIG. 9B illustrates how Client 504 reacts after issuing a Request with DIFQ to the Server.

In Step 1 of FIG. 9B, the Client 504 sends a Request with DIFQ, which may be a specific DelayIndicator or a flag saying it is delay tolerant.

In Step 2 of FIG. 9B, the Client 504 sets up ACK_TIMEOUT Timer for the ACK from Server as in existing CoAP.

In Step 3 of FIG. 9B, the Client 504 waits for the ACK within ACK_Timer.

Step 4 of FIG. 9B, the Client 504 checks whether it receives an ACK from Server, which includes DIFA and tells the expected time to receive the Response. If yes, go to Step 6; if no, go to Step 5 of FIG. 9B.

In Step 5 of FIG. 9B, the Client 504 checks if ACK_Timer expires. If not, it goes to Step 3 and keeps waiting; if yes, it goes to Step 1 and retransmits the Request to the Server.

In Step 6 of FIG. 9B, the Client 504 waits for the Response and may optionally go to sleep before reaching DIFA indicated by DIFA in ACK.

In Step 7 of FIG. 9B, the Client 504 will check whether a response is received. If yes, then the transaction is finished; if not, go to Step 8.

In Step 8 of FIG. 9B, the Client 504 will check whether DIFA expires. If yes, go to Step 1 to retransmit the request by assuming the current Response fails; if not, go to Step 6 and keep waiting.

It is understood that the entities performing the steps illustrated in FIGS. 9A-B are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 9A-B may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 9A-B.

To better illustrate the behaviors of Server and Client, an example is shown below. This example assumes that a list is adopted. FIGS. 10A-D are diagrams that illustrate server scheduling of Multiple Requests. Obviously, other data structures can be applied as needed. For the convenience of illustration, assume all devices are synchronized. For example, there are three Requests c1, c2, c3 arriving within the first slot with delay tolerance of 6 seconds, 3 seconds and 5 seconds respectively. The corresponding timing is implied in FIG. 10A, where one slot means one second in this example. Assume the Server sends a Response per second and has already made the schedule for each Request in the sequence of, for instance, c2 (in $3^{rd}$ second), c3 (in $4^{th}$ second) and c1 (in $6^{th}$ second) after sending an ACK to each of them. The Requests are inserted into the list in chronologically increasing order of calculated DelayIndicator (i.e., the time to send the Response) in FIG. 10B.

Figure 10A:
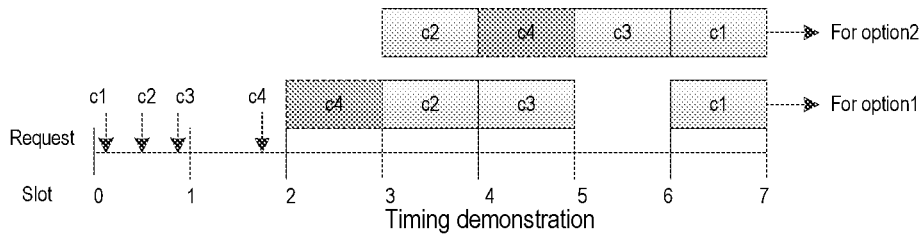
FIGS. 10A-D are diagrams that illustrate server scheduling of Multiple Requests.
Figure 10B:
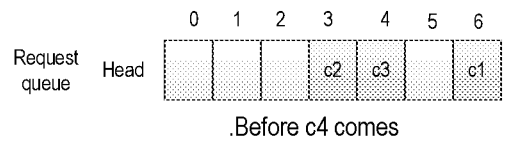
Figure 10C:
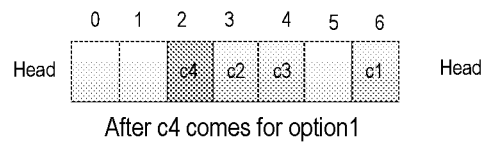
Figure 10D:
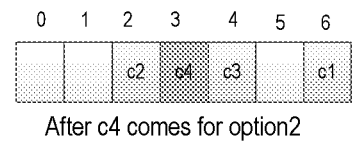

Under the Uninterruptible mode in Step 2.1 in FIG. 10B, when a new Request c4 comes with delay tolerance of 1 second, Server will schedule c4's DelayIndicator in $2^{nd}$ second (as shown in orange), c2's DelayIndicator in $3^{rd}$ second, c3's DelayIndicator in $4^{th}$ second and c1's DelayIndicator in $6^{th}$ second in FIG. 10C. Under the Interruptible mode in Step 2.2 in FIG. 9A, if a new Request c4 comes with delay tolerance of 3 seconds, then its desired schedule would be the $4^{th}$ second which, however, has been scheduled for c3. Because c3 has a larger tolerance, it is better to assign the $4^{th}$ second to c4 instead. Then Sever 502 has to send another ACK to c3 and the final schedule will be c2 (in $3^{rd}$ second), c4 (in $4^{th}$ second shown in green), c3 (in $5^{th}$ second) and c1 (in $6^{th}$ second) as shown in FIG. 10D.

If single list is employed as described with respect to Step 3 of FIG. 9A, current pending Requests c1, c2 and c3 sit in the list (assume the length is 7 and it starts from 0) as shown in FIG. 10A. Before the update, the corresponding time unit for the 3 Requests is 6, 3, and 4 respectively. Now when a new Request c4 comes after 1 second, Server has to update the time unit for the list to be 0, 1 until 5. The first 1 element becomes the end of the new list and will expect the Requests with DelayIndicator of 6. So the time units for the three Requests are 5, 2 and 3 respectively as depicted in FIG. 10C. The new Request should be inserted based on the most up-to-date list.

If multiple lists are employed as described with respect to Step 3 of FIG. 9A, the lists can be connected as a circular list chain. Assume the time scale corresponding to each list is 3 seconds. Whenever a new Request arrives, Server 502 will change the corresponding time scale for each list by minus the elapsed time since last update from the old value. For example, two lists have the time scale of [0, 4) and [4, 8) respectively. Before update, Request c2 is sitting in the first list while Requests c1 and c3 are in the second list. Now when a new Request c4 comes after 4 seconds, Server has already removed the Request c2 in the first list after transmitting its Response. Then the updated time scale for the second list should be [0, 4) and the first list becomes the end of the list chain, which expects Requests with the time scale of [4, 8). But if c4 comes after 2 seconds, then the updated new time scale for the second should be [2, 6) and [0, 2) for first list. The third list is needed for Requests with time scale of [6, 8). The new Request should be inserted based on the most up-to-date list system.

In order to achieve higher efficiency, the received Requests can be stored through multiple lists according to the delay tolerance scale. Assume the time scale for Delay-Indicator in each list is 2 seconds and it starts from 0. Then Requests whose delay value is in [0, 2) will be stored in the $1^{st}$ list once they arrive, Requests whose delay value is in [2, 4) are stored in the $2^{nd}$ list, so and so forth. Server 502 refer to the $1^{st}$ non-empty list to check whether any DelayIndicator expires because those Requests have the smallest delay tolerance. As mentioned in Step 4 in FIG. 9A, the Requests in a list may not be in the order of increasing delay requirement. Rather, they are simply inserted according to their arrival time. This simplification avoids the hassle of reordering Requests every time a new Request arrives in each list, but makes the scheduling less accurate regarding the actual delay tolerance for each Request.

The following describes delay-aware CoAP operation examples.

The basic operation only illustrates the essential messages involved in Delay Aware messaging process. Apart from that, CoAP Server and CoAP Client can commit more efficient actions.

Figure 11:
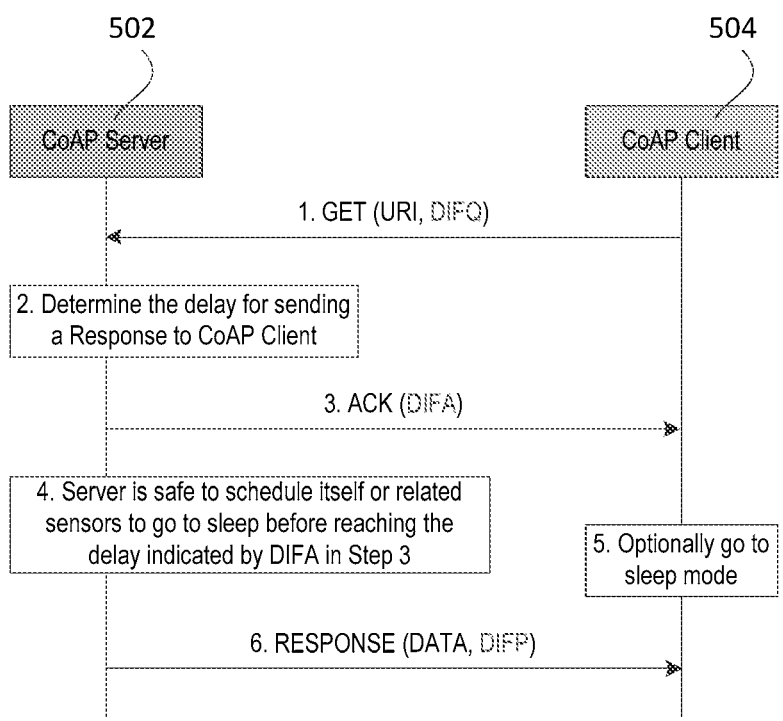
FIG. 11 is a diagram that illustrates an improved GET operation based on the delay method of FIG. 7.

As an example, FIG. 11 shows an improved GET operation based on the delay method of FIG. 7.

In step 1 of FIG. 11, the CoAP Client 504 sends a GET Request to CoAP Server 502 with DIFQ.

In step 2 of FIG. 11, the CoAP Server 502 determines the delay (i.e. DIFA as contained in ACK in Step 3) for sending a Response to CoAP Client 504.

When deciding DIFA, CoAP Server 502 may optionally consider the transmission time for each message, which may be derived from empirical estimates or by asking CoAP Client 504 about the past transmission time because CoAP Client 504 can get the exact value from DIFP, as illustrated in Step 3 of FIG. 7.

If the DIFQ contained in Step 1 of FIG. 11 is a specific time value, CoAP Server may choose a delay not bigger than it.

If the DIFQ contained in Step 1 of FIG. 11 is a time range, CoAP Server may choose a value within this range.

In step 3 of FIG. 11. the CoAP Server sends an ACK to CoAP Client 504. The ACK contains DIFA with a value as determined in Step 2 of FIG. 11.

The DIFA also can be an absolute/relative time value or an absolute/relative time range.

In step 4 of FIG. 11, the CoAP Server may schedule itself or related sensors to go to sleep according to DIFA contained in Step 3 of FIG. 11.

In step 5 of FIG. 11, the CoAP Client 504 receives the ACK and may go to sleep according to DIFA contained in ACK.

In step 6 of FIG. 11, the CoAP Server 502 sends the Response to CoAP Client 504. The Response may contain the actual delay and/or the delay for CoAP Client 504 to send next Request message in DIFP.

It is understood that the entities performing the steps illustrated in FIG. 11 are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIG. 11 may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIG. 11.

GET Operation Under Multiple GET Requests from One Client

Besides single GET operation, sometimes a CoAP Server 502 may receive multiple GET Requests from one CoAP Client. In this case, CoAP Server can make aggregation of ACKs or Responses to reduce the communication overhead. To better explore multiple GET operations with delay tolerance information, consider two GET Requests from the same CoAP Client 504 in FIGS. 12 A-D.

Figure 12A:
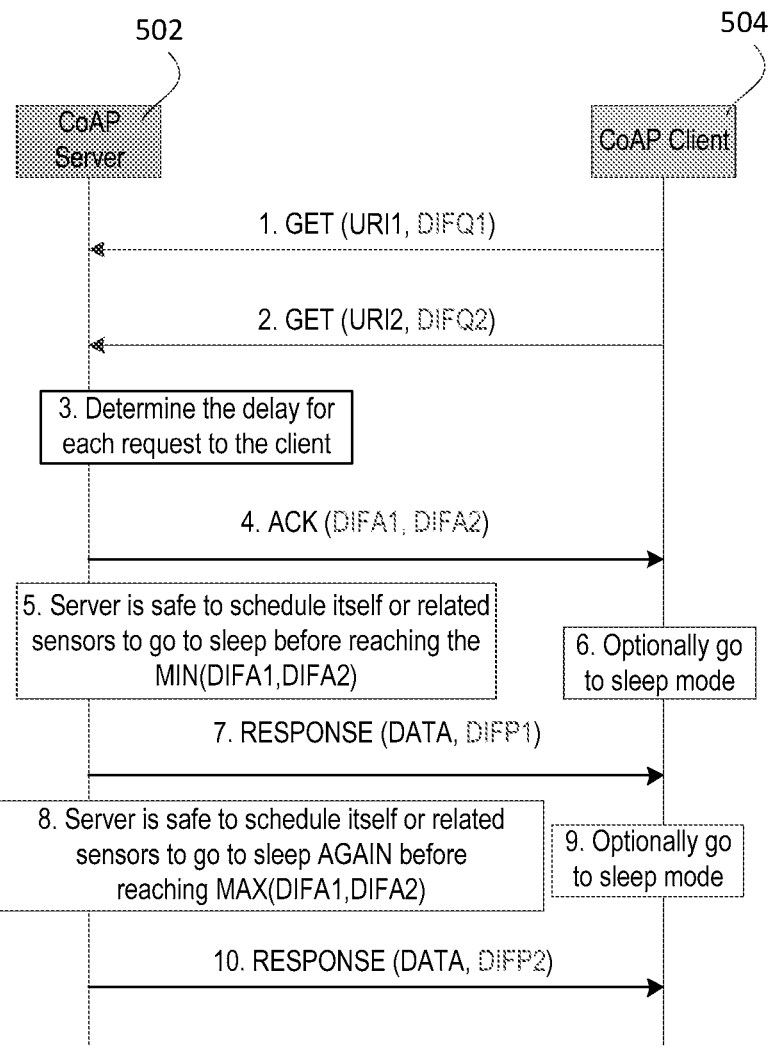
FIGS. 12 A-D are diagrams that illustrate GET operation with multiple GET requests from one client.

FIGS. 12 A-D are diagrams that illustrate GET operation with multiple GET requests from one client. FIG. 12A processes two concurrent Requests (i.e. the second Request is sent before the first ACK timeout) with aggregated ACK and separate Response; FIG. 12B has two concurrent Requests with aggregated ACK and aggregated Response; and FIGS. 12C and 12D handle two sequential Requests. FIG. 12A includes the following steps:

In step 1 of FIG. 12A, the CoAP Client 504 sends a GET Request to CoAP Server 502 for URI1 with DIFQ1.

In step 2 of FIG. 12A, the CoAP Client 504 sends another GET Request to CoAP Server 502 for URI2 with a different DIFQ2 before the first ACK timeout.

For the convenience of illustration, the two transactions are required to use the same DelayIndicator representation, i.e., either absolute or relative time.

In step 3 of FIG. 12A, the CoAP Server 502 determines the delay for sending a Response to CoAP Client for each Request.

CoAP Server 502 should be able to consider DIFQ1 and DIFQ2 together to choose an appropriate delay value for each Request.

In step 4 of FIG. 12A, the CoAP Server sends an aggregated ACK to CoAP Client 504 for both Requests. The ACK contains DIFA1 and DIFA2 each with a value determined in Step 3 of FIG. 12A.

This aggregated ACK is to acknowledge the two Requests in Step 1 and Step 2 of FIG. 12A. It has to include the two Message IDs corresponding to the Requests.

In step 5 of FIG. 12A, the CoAP Server may schedule itself or related sensors to go to sleep according to the smaller DelayIndicator contained in Step 4 of FIG. 12A.

MIN (DIFA1, DIFA2) means the minimum value of the two DIFAs. It is possible for CoAP Server to decide the DelayIndicator by other rule besides MIN, like the mean value, depending on the application or CoAP Server's preference.

In step 6 of FIG. 12A, the CoAP Client 504 receives the ACK and may go to sleep according to the DIFA contained in the ACK.

In step 7 of FIG. 12A, the CoAP Server sends the Response to CoAP Client 504 for the Request with smaller DelayIndicator. The Response may contain the actual delay reflected by DIFP1.

In step 8 of FIG. 12A, the CoAP Server may schedule itself or related sensors to go to sleep again according to the larger DIFA contained in Step 4 of FIG. 12A.

MAX (DIFA1, DIFA2) means the maximum value of the two DIFAs. It is possible for server to decide the DelayIndicator by other rule besides MAX.

The suggested DIFAs in ACK might be different from the one in the Response, possibly due to time out by CoAP Server's late wake up from sleeping or server's temporary congestion.

In step 9 of FIG. 12A, the CoAP Client 504 may go to sleep again based on the DIFA contained in the ACK.

In step 10 of FIG. 12A, the CoAP Server sends the Response to CoAP Client for the Request with a larger DelayIndicator. The Response may contain the actual delay reflected by DIFP2.

Figure 12B:
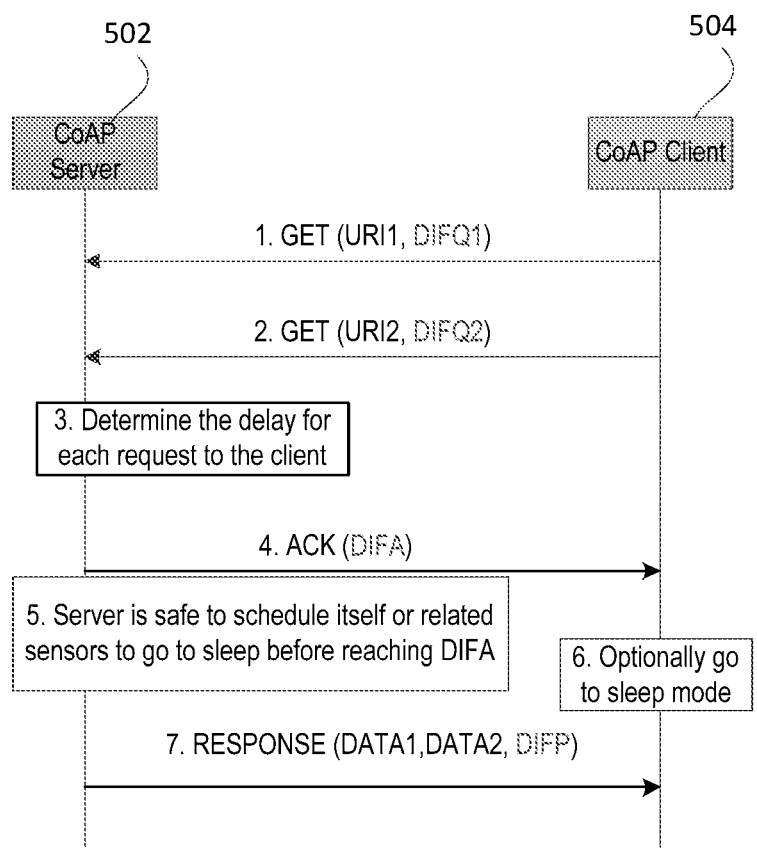

FIG. 12B shows the aggregation of ACKs and Responses.

Step 1 to Step 3 of FIG. 12B are the same as the steps 1-3 of FIG. 12A.

Step 4 of FIG. 12B, the CoAP Server sends an ACK to CoAP Client for both Requests. The ACK contains DIFA with a value determined in Step 3 of FIG. 12B.

This is an aggregated ACK to acknowledge the two Requests in Step 1 and Step 2 of FIG. 12B. It has to include the two Message IDs corresponding to the Requests.

If absolute time is adopted, only one DelayIndicator is needed in ACK because CoAP Server 502 decides to send the two Responses together in a single message.

If relative time is employed, separate DelayIndicator is needed for each Request based on the time stamp that two Requests are received.

Step 5 to Step 6 of FIG. 12B are the same as the steps 5-6 of FIG. 12A.

In step 7 of FIG. 12B, the CoAP Server 502 sends a single Response to CoAP Client for the two Requests. The Response has two data chunks sequentially and may contain the DelayIndicator applied to both Requests.

This is an aggregated Response for the two Requests in Step 1 and Step 2 of FIG. 12B. It has to include the two Token IDs and two payloads corresponding to each Request.

Since the time difference from ACK being sent to the current time is still the same for the two Requests, no matter absolute or relative time is adopted, only one DelayIndicator is needed.

Figure 12C:
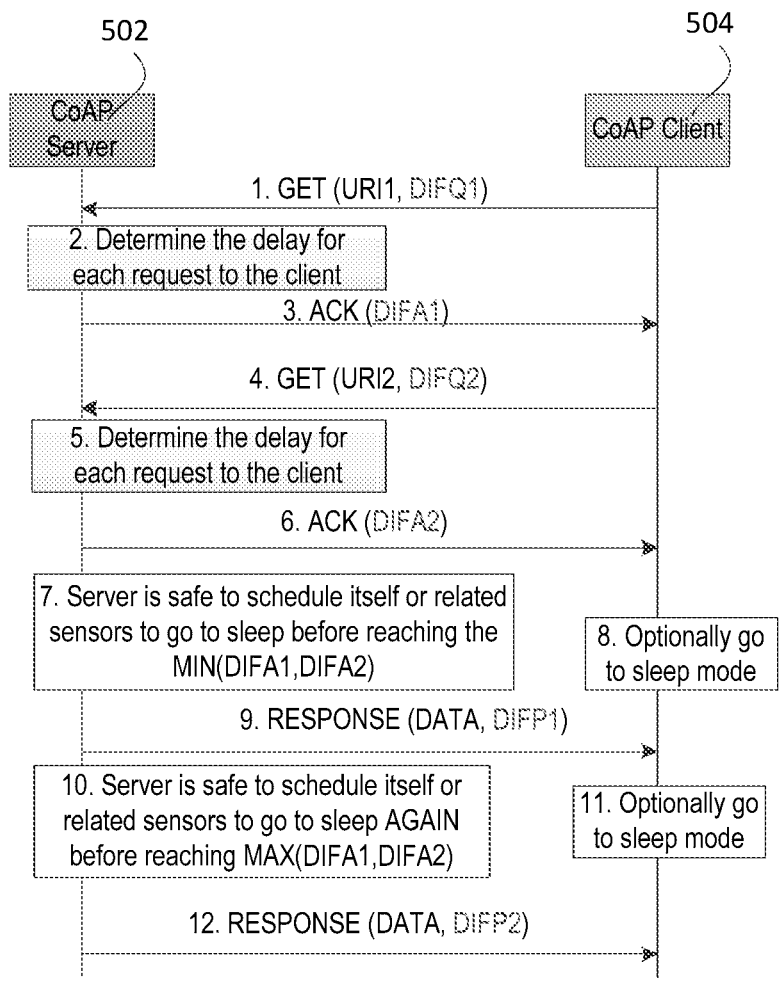

FIG. 12C shows the scenario with sequential GET Requests with separate Responses.

Step 1 of FIG. 12C is the same as step 1 of FIG. 12A.

In step 2 of FIG. 12C, the CoAP Server 502 determines the delay for sending a Response to CoAP Client.

In step 3 of FIG. 12C, the CoAP Server 502 sends an ACK to CoAP Client for the first Request. The ACK contains a DIFA1 with a value as determined in Step 2.

Step 4 of FIG. 12C, is the same as Step 2 of FIG. 12A.

In step 5 of FIG. 12C, the CoAP Server 502 determines the delay for sending a Response to CoAP Client 504.

In step 6 of FIG. 12C, the CoAP Server 502 sends an ACK to CoAP Client 504 for the second Request.

In step 7 of FIG. 12C, the CoAP Server 502 may schedule itself or related sensors to go to sleep again according to the larger DIFA contained in Step 7 of FIG. 12C.

MAX (DIFA1, DIFA2) means the maximum value of the two DIFAs. It is possible for server to decide the DelayIndicator by other rule besides MAX.

The suggested DIFAs in ACK might be different from the one in the Response, possibly due to time out by CoAP Server's late wake up from sleeping or server's temporary congestion.

In step 8 of FIG. 12C, the CoAP Client 504 may go to sleep again based on the DIFA contained in the ACK.

In step 9 of FIG. 12C, the CoAP Server 502 sends the Response to CoAP Client 504 for the Request with smaller DelayIndicator. The Response may contain the actual delay reflected by DIFP1.

In step 12 of FIG. 12C, the CoAP Server 502 sends the Response to CoAP Client 504 for the Request with a larger DelayIndicator. The Response may contain the actual delay reflected by DIFP2.

Figure 12D:
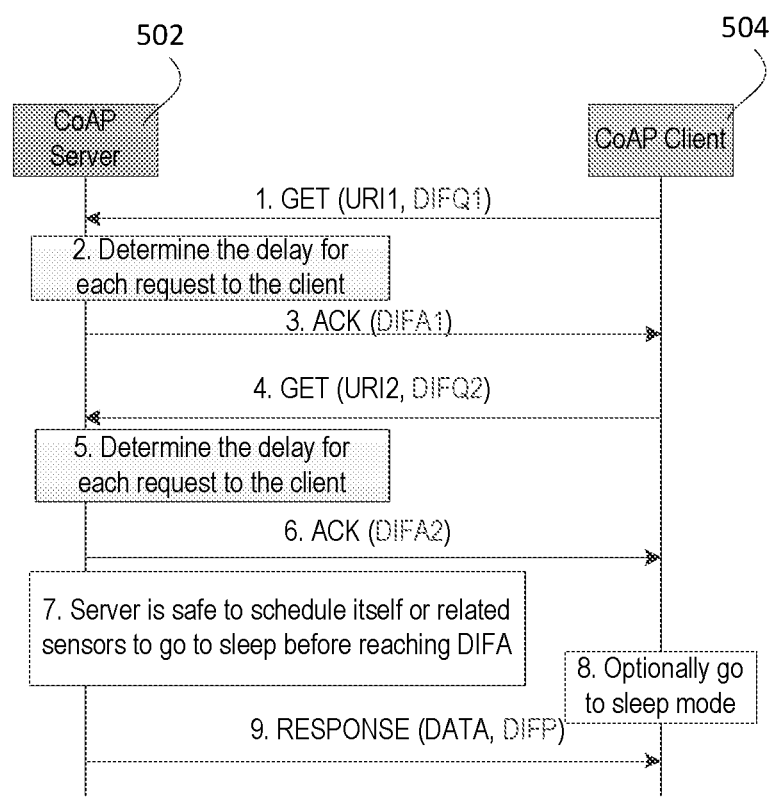

FIG. 12D shows the scenario with sequential GET Requests with aggregated Response.

Step 1 of FIG. 12D is the same as step 1 of FIG. 12A.

In step 2 of FIG. 12D, the CoAP Server 502 determines the delay for sending a Response to CoAP Client 504.

In step 3 of FIG. 12D, the CoAP Server sends an ACK to CoAP Client 504 for the first Request. The ACK contains a DIFA1 with a value as determined in Step 2 of FIG. 12D.

Step 4 of FIG. 12D is the same as Step 2 of FIG. 12A.

In step 5 of FIG. 12D, the CoAP Server determines the delay for sending a Response to CoAP Client 504.

In step 6 of FIG. 12D, the CoAP Server sends an ACK to CoAP Client 504 for the second Request.

Step 7 of FIG. 12D to Step 8 of FIG. 12D are the same as Step 5 to Step 6 in FIG. 12A.

In step 9 of FIG. 12D, the CoAP Server 502 sends a single Response to CoAP Client 504 for the two Requests. The Response has two data chunks sequentially and may contain the DelayIndicator applied to both Requests.

This is an aggregated Response for the two Requests in Step 1 and Step 4 of FIG. 12D. The aggregated Response includes the two Token IDs and two payloads corresponding to each Request.

Since the time difference from ACK being sent to the current time is still the same for the two Requests, no matter absolute or relative time is adopted, only one DelayIndicator is needed.

It is understood that the entities performing the steps illustrated in FIGS. 12A-D are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 12A-D may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 12A-D.

Not limited to the Requests from one CoAP Client, CoAP Server is inclined to receive Requests from multiple CoAP Clients 504 and 506. Also there may be a proxy 1302 between CoAP Server 502 and CoAP Client 504 to help buffer and forward messages. The proxy 1302 can either make simple forwarding for two endpoints or involve more advanced message scheduling to better balance the ongoing traffic in its convenience. For other operations such as PUT, POST or DELETE, they have the similar messaging process as GET, so we only elaborate on GET operation.

Figure 13A:
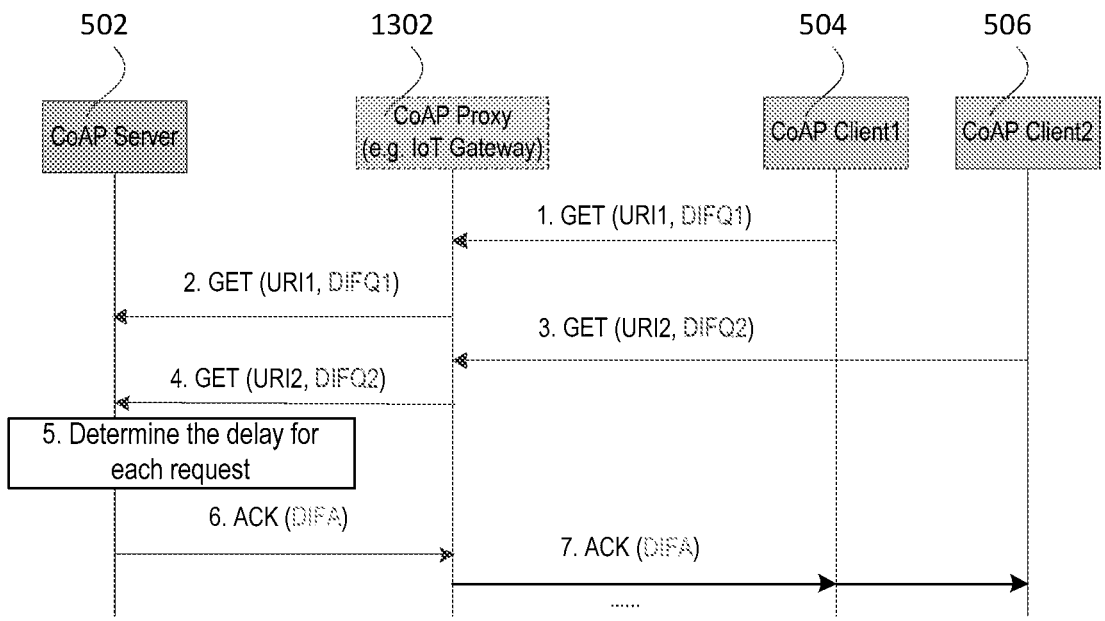
FIG. 13 A-B are diagrams that illustrate the GET operation involving two GET Requests from different CoAP Clients with a CoAP Proxy.

FIG. 13 A-B are diagrams that illustrate the GET operation involving two GET Requests from different CoAP Clients 504 and 506 with a CoAP Proxy 1302 under two scenarios. First, the proxy 1302 only plays the role of message forwarding and CoAP Server makes ACK aggregation before delivering to CoAP Proxy 1302 in FIG. 13A with the following steps:

In step 1 of FIG. 13A, the CoAP Client1 504 sends a GET Request to CoAP Proxy 1302 including DIFQ1.

In step 2 of FIG. 13A, the CoAP Proxy 1302 forwards the Request to CoAP Server 502 immediately.

In step 3 of FIG. 13A, the CoAP Client2 sends a GET Request to CoAP Proxy 1302 including DIFQ2.

In step 4 of FIG. 13A is the same as Step 2 of FIG. 13A.

In step 5 of FIG. 13A, the CoAP Server 502 determines the delay for sending a Response to each CoAP Client.

In step 6 of FIG. 13A, the CoAP Server sends an aggregated ACK to CoAP Proxy 1302 including the DIFA1 and DIFA2 for each CoAP Client.

This ACK includes two Message IDs corresponding to each Request. If CoAP Server 502 intends to aggregate the Response, only a single DelayIndicator is needed if using absolute DelayIndicator. A separate DelayIndicator will be needed if using relative DelayIndicator.

If CoAP Server intends to send separate Response, then Separate DelayIndicator will be needed in the ACK.

In Step 7 of FIG. 13A, the CoAP Proxy 1302 forwards the ACK received from CoAP Server 502 to the two CoAP Clients 504 and 506.

When forwarding the ACK to CoAP Clients 504 and 506, the proxy can split the aggregated ACK into two and forward them to the corresponding CoAP Client 504 and 506.

The following steps are ignored, where CoAP Proxy 1302 always simply forwards message between CoAP Server 502 and Client 504 and 506.

Figure 13B:
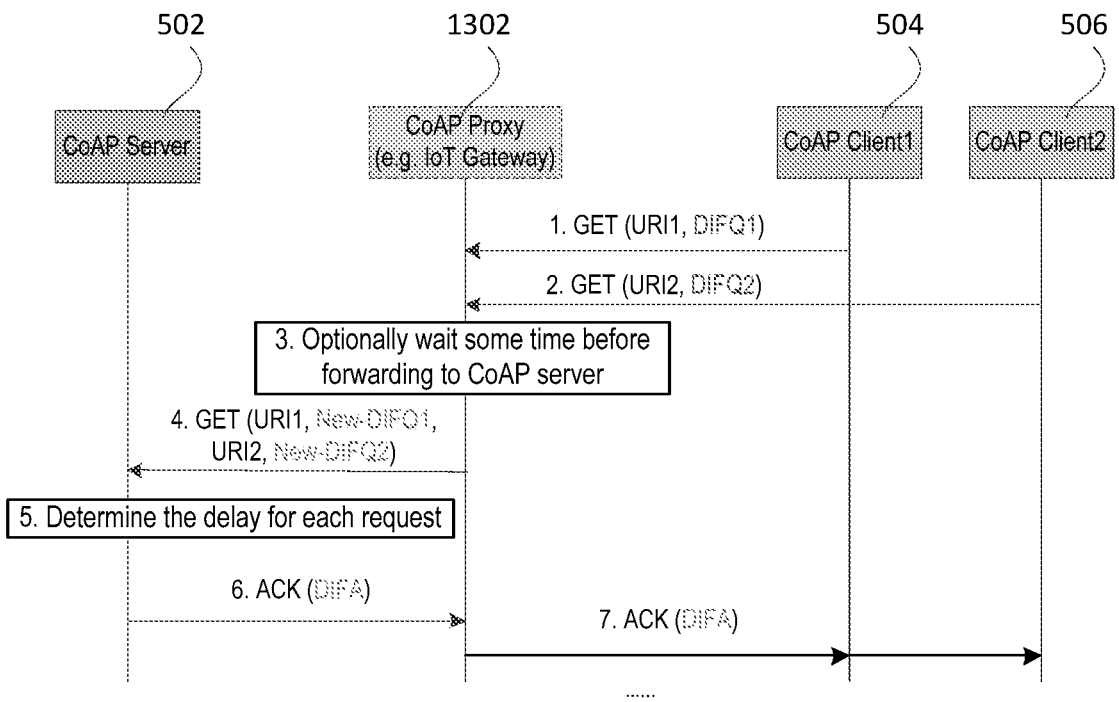

Apart from CoAP Server's ACK aggregation, CoAP Proxy 1302 also can aggregate messages before forwarding to CoAP Server 502 or Client in FIG. 13B with the following steps:

In step 1 of FIG. 13B, the CoAP Client1 504 sends a GET Request to CoAP Proxy 1302 including DIFQ1.

In step 2 of FIG. 13B, the CoAP Client2 506 sends a GET Request to CoAP Proxy 1302 including DIFQ2.

In step 3 of FIG. 13B. the CoAP Proxy 1302 may decides to wait some time before forwarding the Requests to CoAP Server 502. This may be due to the heavy ongoing traffic or the fact that CoAP Server being in sleeping mode.

In step 4 of FIG. 13B, the CoAP Proxy combines the two GET Requests and forwards once to CoAP Server 502.

The new-DIFQs should be adjusted from the waiting time at CoAP Proxy under relative time representation. E.g., if the waiting time is 10 seconds, under relative time representation, the new-DIFQ should be the old DIFQ minus 10; under absolute time representation, DIFQ stays the same.

The two URIs are indicated in CoAP Option and the two DIFQs are included in the DelayIndicator Option.

In step 5 of FIG. 13B, the CoAP Server 502 determines the delay for sending a Response to each CoAP Client 504 and 506.

In step 6 of FIG. 13B is the same as Step 6 of FIG. 13A.

In step 7 of FIG. 13B, the CoAP Proxy forwards the ACK received from CoAP Server to the two CoAP Clients.

When forwarding the ACK to CoAP Clients 504 and 506, the proxy can split the aggregated ACK into two and forward them to the corresponding CoAP Client 504 and 506.

Alternatively, the proxy can issue multicast group establishment to let the two CoAP Clients 504 and 506 join a suggested multicast address in the ACK. Although this involves additional Multicast group establishment procedure, it might facilitate future Responses in the form of Multicast Response to CoAP Clients 504 and 506.

The following steps are ignored, where CoAP Proxy 1302 has the flexibility to decide the time of forwarding the message to CoAP Server or Client. It is possible to pick up a convenient time to make the forwarding. It is understood that the entities performing the steps illustrated in FIGS. 13A-B are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 13A-B may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 13A-B.

Delay-Enabled Multicasting of CoAP Responses

Different CoAP Clients may have diverse delay requirements. Based on the received delay requirements, CoAP Server 502 can establish a temporary multicast group by putting CoAP Clients with similar delay requirements together. Then CoAP Server 502 sends a multicast Response to the group after a properly scheduled period, instead of unicast for each Request. Especially when many clients (e.g., hundreds or more) Requesting the same resource are in the same LAN, the functionality of delay enabled multicast will display more benefits. The multicast group can be reused by CoAP Server to send multicast Response for future Requests from these two or more clients.

Figure 14A:
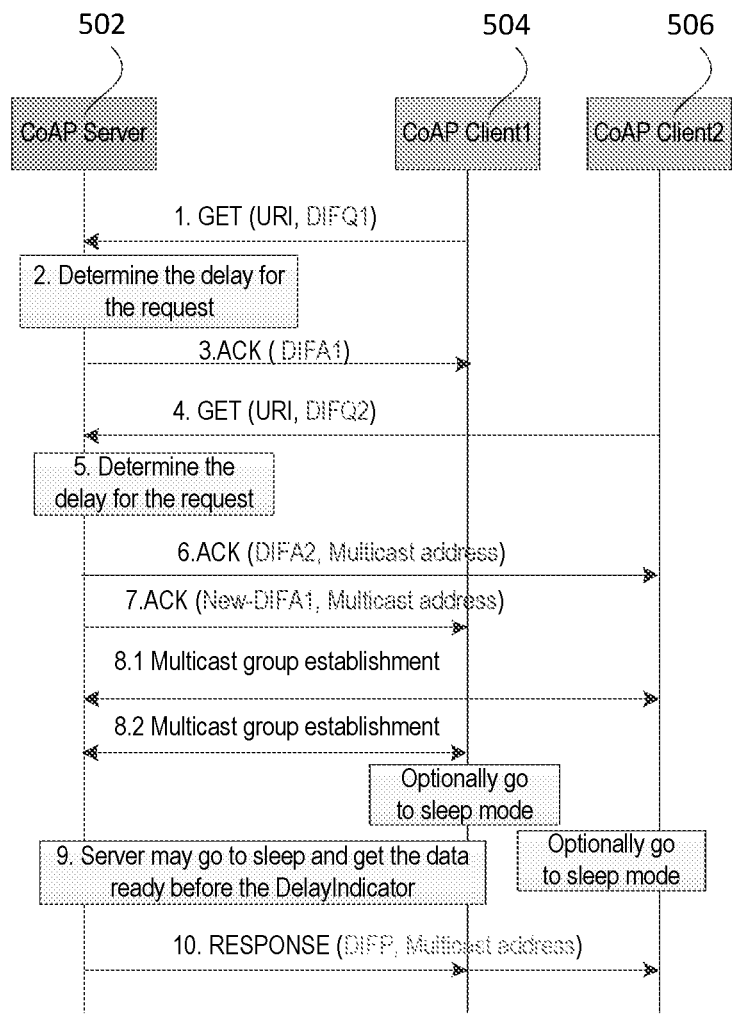
FIGS. 14 A-C are diagrams that demonstrate the use of delay information to enable multicast Response.
Figure 14B:
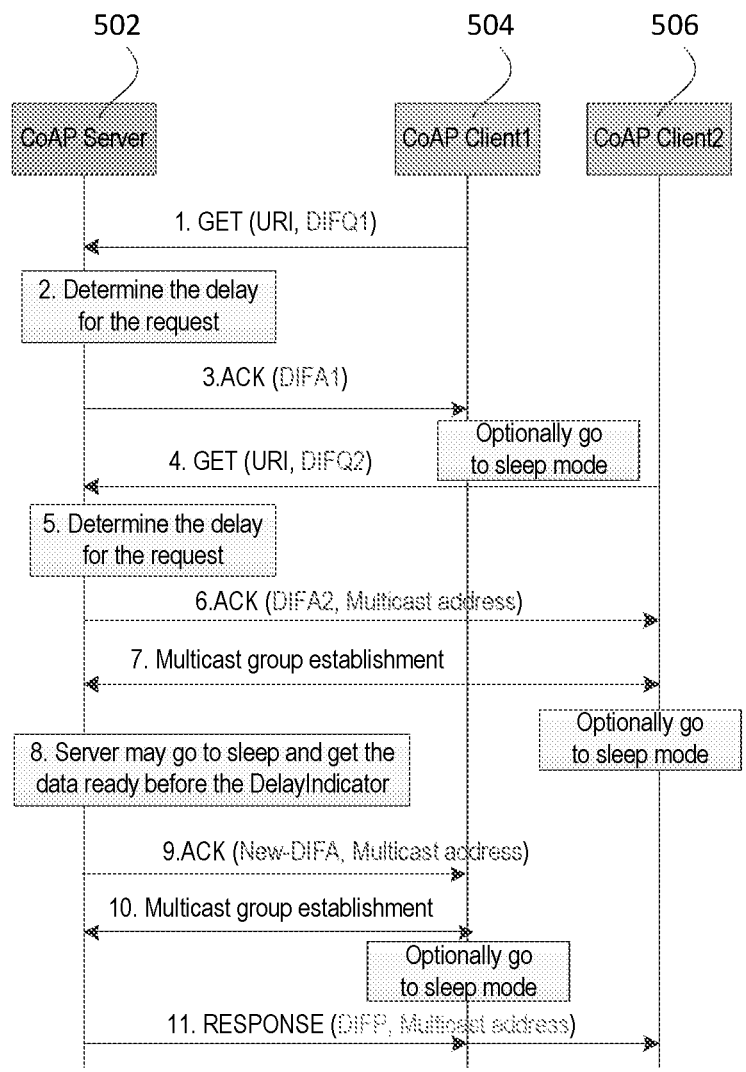
Figure 14C:
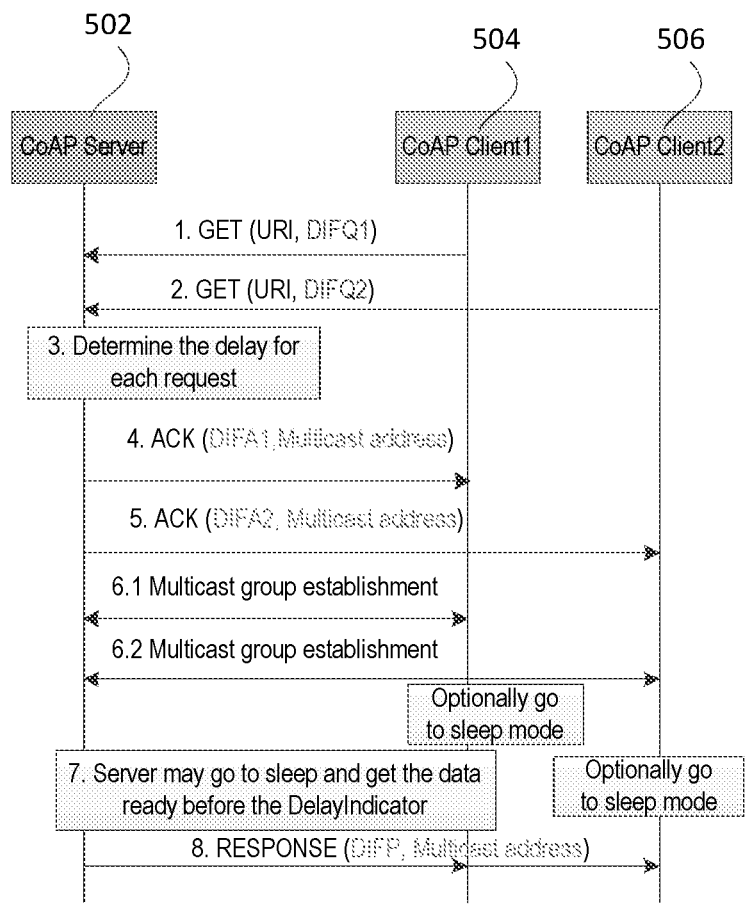

FIGS. 14 A-C are diagrams that demonstrate the use of delay information to enable multicast Response. Depending on the when CoAP Server 502 receives the Requests and CoAP Clients' sleeping schedule, there are three scenarios under consideration. FIGS. 14A-B deal with two sequential Requests, where CoAP Server will send ACK immediately after each Request. The CoAP Client1's sleeping schedule will influence the time that CoAP Server sends the new ACK with preferred multicast address. Specifically, FIG. 14A assumes CoAP Client1 has sleeping plan after the first ACK and FIG. 14B assumes otherwise. FIG. 14C considers two concurrent Requests and CoAP Server issues the ACK with preferred multicast address immediately.

In FIG. 14A, the CoAP Server receives two Requests sequentially and aggregates the Responses to two CoAP Clients by a multicast Response providing Client1 stays awake before the second Request arrives.

Step 1 to Step 3 of FIG. 14A are similar to steps 1-3 of FIG. 12C.

After receiving the ACK, Client1 stays awake without going to sleep.

In step 4 of FIG. 14A, the CoAP Client2 sends a GET Request with DIFQ2 for the same URI as CoAP Client1 504 in Step 1 of FIG. 14A.

For the convenience of illustration, the two transactions are required to use the same DelayIndicator representation, i.e., either absolute or relative time.

In step 5 of FIG. 14A, the CoAP Server determines the delay for sending a Response to CoAP Client2 506.

In step 6 of FIG. 14A, the CoAP Server sends an ACK to CoAP Client2 506 with a Multicast address. CoAP Client2 506 is expected to accept the Multicast address in order to receive the data.

In order to attach the suggested Multicast address, a new option, for example, Multicast Address Option, needs to be added in ACK.

In step 7 of FIG. 14A, the CoAP Server 502 sends an ACK to Client1 504 with the same Multicast address. CoAP Client1 504 is expected to accept the Multicast address in order to receive the data.

Similarly, in one embodiment, a new option for the Multicast address is added in ACK.

There may be privacy issues in Multicast, thus a common key may need to be shared by clients joining this group, which can be contained in this ACK in Step 6 and Step 7.

In step 8.1 of FIG. 14A, the CoAP Server and CoAP Client2 506 start Multicast group establishment to let CoAP Client2 join the suggested Multicast address.

This can be achieved by the existing approach. CoAP Client2 needs to send a Join message to inform CoAP Server 502 and intermediate routers of the multicast group it is joining.

Client2 506 can optionally go to sleep.

In step 8.2 of FIG. 14A the Multicast group establishment for CoAP Client1 504 is similar to Step 8.1 of FIG. 14A.

In step 9 of FIG. 14A the CoAP Server 502 may go to sleep for some time before the scheduled sending time is up.

In step 10 of FIG. 14A the CoAP Server 502 sends the data to the Multicast Address. Since clients 504 and 506 make their sleeping schedule based on the DIFA, CoAP Server 502 can estimate whether all clients are awake before sending the Response.

To enable CoAP Clients 504 and 506 to recognize and match the Response with corresponding Request, every Token ID has to be included in the Response. Again, there are two alternatives to attach the additional Token ID, either in the Token ID field after CoAP Header or in the option field.

As the size of Multicast group increases, more Token IDs are included in the Response, becoming a heavy overhead. To facilitate the matching process for CoAP Clients, it is desired to employ some advanced Hashing algorithms to compress the Token IDs in a Response, such as Bloom Filter, etc.

For absolute time representation, only one DIFP is needed. For relative time representation, separate DIFP may be needed for each Request.

In FIG. 14B, CoAP Server receives two Requests sequentially and aggregates the Responses to two CoAP Clients by a multicast Response with the first Client optionally going to sleep before the second Request arrives.

Step 1 to Step 3 of FIG. 14B are similar to steps 1-3 of FIG. 12C.

When receiving the ACK, Client1 504 optionally goes to sleep.

In step 4 of FIG. 14B, the CoAP Client2 506 sends a GET Request with DIFQ2 for the same URI as CoAP Client1 504 in Step 1.

In step 5 of FIG. 14B, the CoAP Server considers the first Request from Client1 504 and makes a new schedule based on the two Requests with a New-DIFA in ACK to be used in Step 9 of FIG. 14B.

In step 6 of FIG. 14B is the same as Step 6 in FIG. 14A.

In step 7 of FIG. 14B, the CoAP Server 502 and Client2 506 start a Multicast group establishment to enable CoAP Client2 to join the suggested Multicast address.

After Multicast group establishment, CoAP Client2 506 can optionally go to sleep.

In step 8 of FIG. 14B, the CoAP Server may go to sleep for some time before the scheduled sending time for Client1 is up.

The reason CoAP Server does not send ACK with the Multicast address to Client1 504 is that Client1 now is in sleep thus not able to receive the message.

In step 9 of FIG. 14B, the CoAP Server 502 sends an ACK to Client1 504 with a Multicast address. CoAP Client1 504 is expected to accept the Multicast address in order to receive the data.

In step 10 of FIG. 14B, the Server 502 and Client1 504 starts a Multicast group establishment to let Client1 504 join the suggested Multicast address.

After Multicast group establishment, CoAP Client1 504 can optionally go to sleep.

In step 11 of FIG. 14B, is the same as Step 10 of FIG. 14A.

For FIG. 14C the two Requests are received in a very close order, thus CoAP Server 502 can avoid sending the ACK twice for the first Request.

In step 1 to step 2 of FIG. 14C, the CoAP Client1 504 and Client2 506 send a GET Request to CoAP Server 502 for the same URI with DIFQ1 and DIFQ2 respectively.

In step 3 of FIG. 14C, the CoAP Server determines the delay for sending a Response to CoAP Client 504 and 506 for each Request.

In step 4 of FIG. 14C, the CoAP Server decides to ask CoAP Client1 504 to establish a Multicast group by sending an ACK with a Multicast address.

In step 5 of FIG. 14C, the CoAP Server sends a similar ACK to CoAP Clients2 506 with the same Multicast address.

Steps 6.1 to Step 8 of FIG. 14C are similar to Steps 8.1 to Step 10 of FIG. 14A.

It is understood that the entities performing the steps illustrated in FIGS. 14A-C are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 14A-C may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 14A-C.

Figure 15:
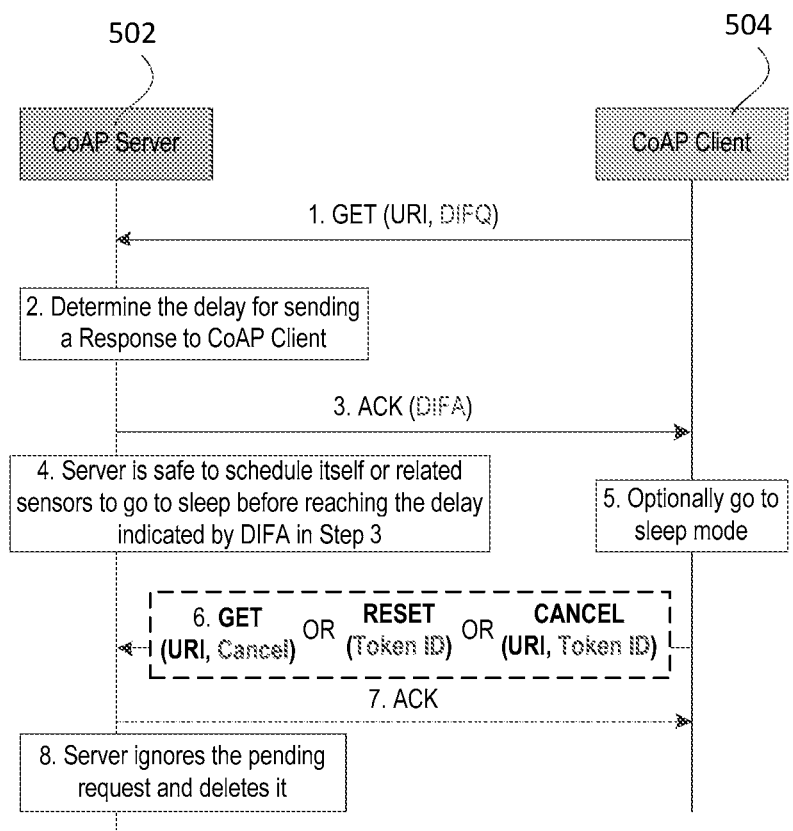
FIG. 15 is a diagram that illustrates delay-enabled CoAP cancellation.

FIG. 15 is a diagram that illustrates delay-enabled CoAP cancellation. Before receiving the Response from CoAP Server 502, it is possible that CoAP Client 504 finds the Requested data is no longer needed. From the existing CoAP, it can achieve this by rejecting the Response sent from CoAP Server 502. But this is a waste of channel bandwidth and power because the Response usually contains a larger data chunk compared to a lightweight GET Request without payload. In order to spare the unnecessary data transmission, four new approaches for cancellation are discussed below.

Relying on different types of Requests or methods, there are four approaches to achieve the functionality of cancelling a Request. The detailed messaging process for the first three is shown in FIG. 15 with the following steps:

Step 1 to Step 5 of FIG. 15 are similar as steps 1-5 of FIG. 11.

In step 6 of FIG. 15, the CoAP Client 504 finds it does not need the data anymore and sends a cancellation Request to CoAP Server before receiving the Response. The cancellation Request includes the same Token ID as in the GET Request in Step 1. The detailed message format is illustrated in FIG. 23.

First way is to make "Cancel" a new option attached in a normal GET Request as the first option. Second way is to use RESET message and attach the corresponding Token ID as the second option. Another way is to issue a CANCEL Request and attach the corresponding Token ID as the third option. This needs to create a new method CANCEL in CoAP protocol.

In step 7 of FIG. 15, the CoAP Server 502 receives the cancellation and sends back an ACK indicating the reception of the cancellation Request.

for RESET message in Step 6, no ACK is needed.

If the CoAP Server is in sleep mode and not able to receive the cancellation message, CoAP Client 504 may try again after some backoff time based on the DelayIndicator in Step 3. But, the CoAP Client 504 will stop trying once it receives the Response and will simply rejects the Response.

In step 8, the CoAP Server will ignore the pending Request and delete it.

Figure 16:
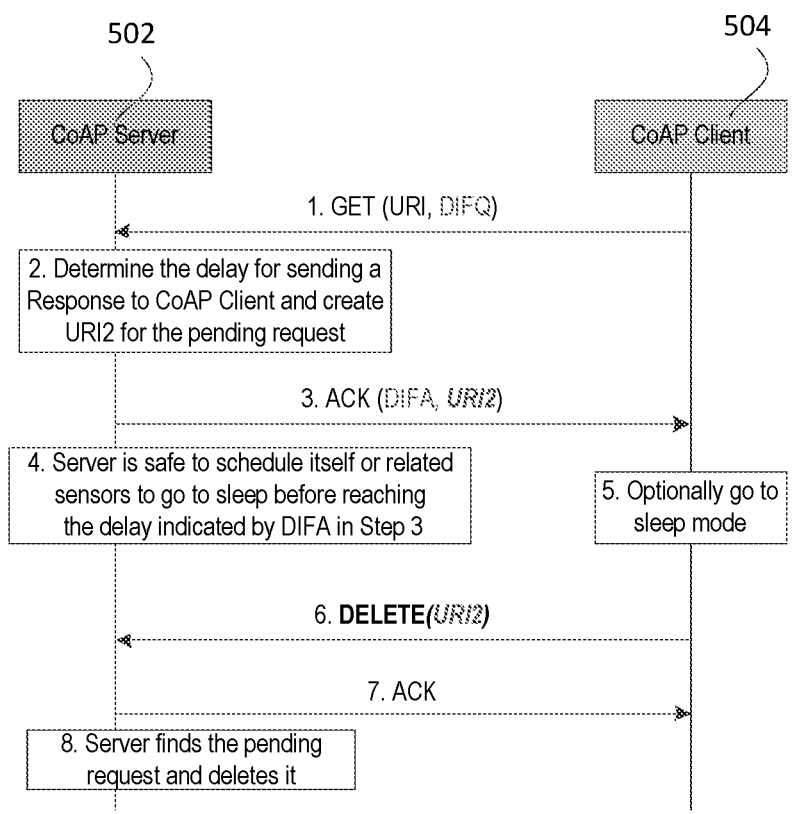
FIG. 16 is a diagram that illustrates a scheme to implement Cancel operation via DELETE Request.

FIG. 16 is a diagram that illustrates a scheme to implement Cancel operation via DELETE Request. This operation requires CoAP Server 502 to create a list of resource representations (i.e., URIs) for the pending Requests. Each pending Request can be represented in the form of URI. With it, CoAP Server can directly locate the pending Request and delete it to avoid fulfillment. The deletion of a pending Request is actually equivalent to cancel a Request. Since this involves extra overhead for CoAP Server 502 to create a new representation for the pending request, it is up to Server whether to use this method. The detailed procedure is as following:

In step 1 of FIG. 16, the CoAP Client 504 sends a GET Request to CoAP Server for URI with DIFQ.

In Step 2 of FIG. 16, the CoAP Server determines the delay for sending a Response to CoAP Client. Based on the Requested URI in Step 1, it creates the new resource identifier URI2, which directly points to the pending Request in Step 1.

In step 3 of FIG. 16 the CoAP Server 502 sends an ACK with DIFA and URI2 determined in Step 2.

The ACK should include both DIFA and URI2.

Step 4 to Step 5 of FIG. 16 are the same as Step 4 to Step 5 of FIG. 11.

In step 6 of FIG. 16, the CoAP Client finds it does not need the data anymore, so it issues a DELETE Request to remove the pending Request indicated by URI2.

In step 7 of FIG. 16 is the same as step 7 of FIG. 15.

In step 8 of FIG. 16, the CoAP Server 502 will find the pending Request through URI2 and delete it.

When considering multiple Requests from one CoAP Client 504, the cancellation may have impact on the expected delay scheduled for another Request by CoAP Server 502, which is embodied by the Response time for the second GET Request. The final Response time for the two Requests is determined by the two DIFQs together, which, for instance, could be the minimal value of the two. However, the cancellation of first Request allows CoAP Server 502 to make another schedule that is only concentrated on the second Request. Therefore, the Response may be sent later than that without cancellation.

Figure 17:
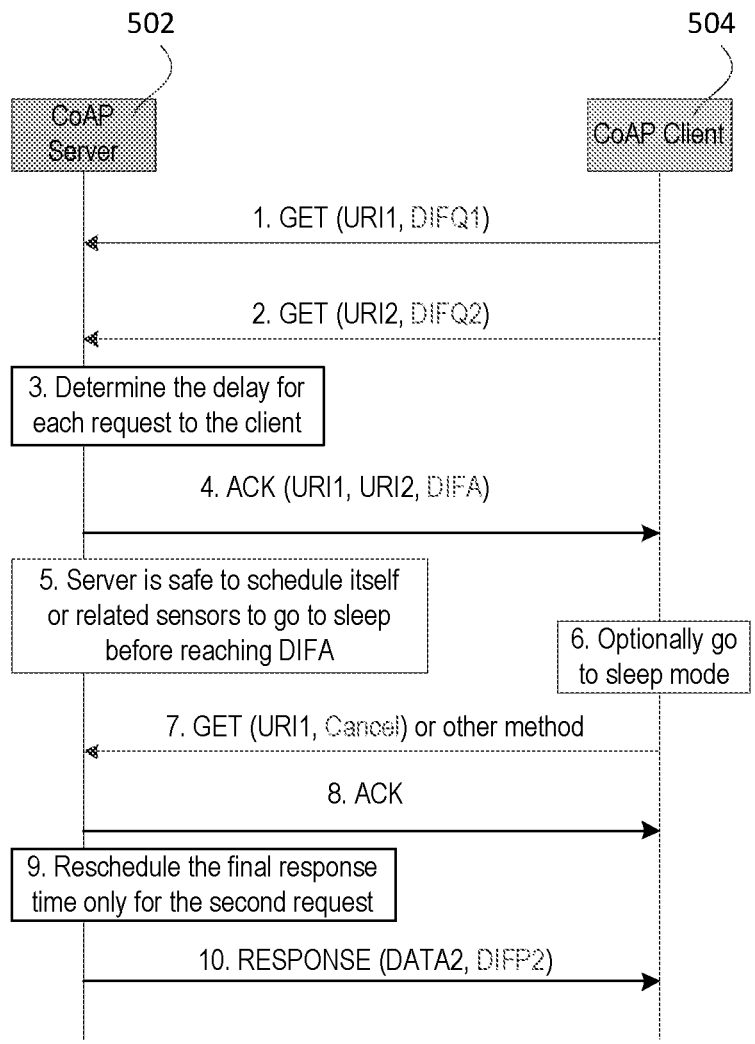
FIG. 17 is a diagram that illustrates the impact of cancelling one CoAP request on others pending requests.

FIG. 17 is a diagram that illustrates the impact of cancelling one CoAP request on others Step 1 to Step 6 of FIG. 17 are the same as that in FIG. 12A.

In step 7 of FIG. 17, the CoAP Client wants to cancel the first GET Request. It launches Cancellation using any cancellation approach presented in FIG. 15 and FIG. 16.

In step 8 of FIG. 17, if the cancellation is based on GET, CANCEL or DELETE (requires ACK in Step 4 to give the URI of the pending Requests) operation, an ACK is expected from CoAP Server 502 to CoAP Client 504. Otherwise, no ACK is needed.

In step 9 of FIG. 17. the CoAP Server 502 reschedules the Response time for the currently pending Request (i.e., the second Request).

DIFP2 may be later than the prescheduled DIFA if DIFQ1 is less than DIFQ2.

DIFP2 may be the same as the prescheduled DIFA if DIFQ1 is larger than DIFQ2.

In step 10 of FIG. 17, the CoAP Server sends the Response for the second Request to CoAP Client 504.

Note that although a few schemes have been proposed for CoAP cancellation, the four approaches FIG. 15 and FIG. 16 in this disclosure are different from them.

First, the most significant information to determine a cancellation can be DelayIndicator (i.e., DIFA in ACK). Based on DIFA, CoAP Client 504 can estimate the arrival time of the Response. If there is still some remaining time before the DIFA expires, then Client can launch a cancellation as needed. Otherwise, if the Response is probably on the way, it just rejects it.

In addition, using DELETE to cancel a previous Request in FIG. 16 is novel.

Figure 1:
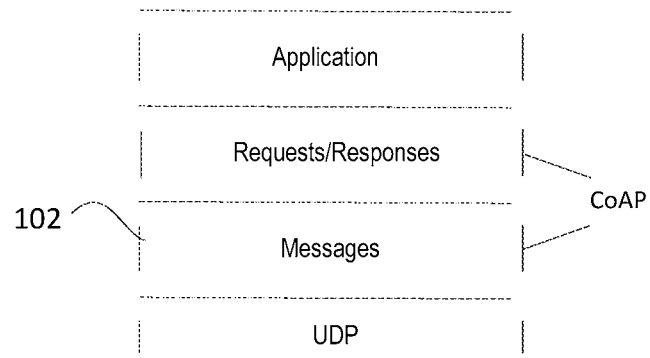
FIG. 1 is a diagram that illustrates the Constrained Application Protocol (CoAP) modelled as a two-layer protocol.
Figure 2:
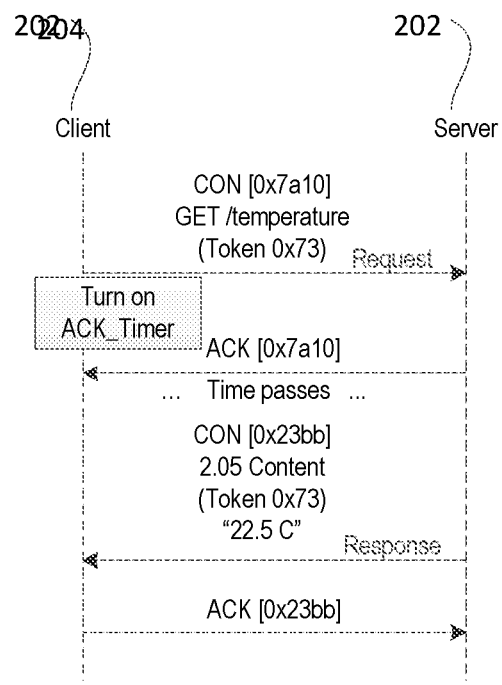
FIG. 2 is a diagram that illustrates a typical messaging process with a separate Response.
Figure 3:
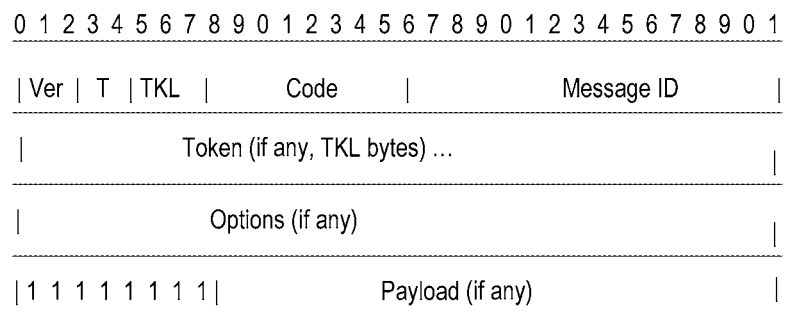
FIG. 3 is a diagram that illustrates a CoAP message format.
Figure 4:
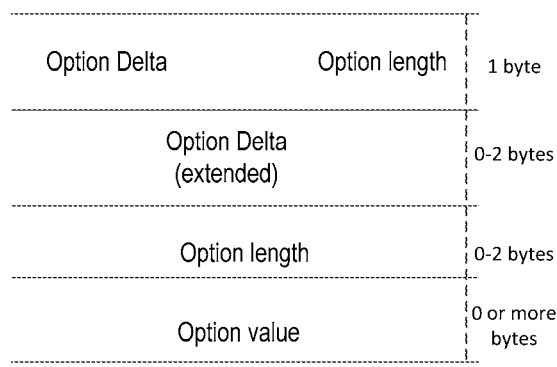
FIG. 4 is a diagram that illustrates the CoAP Option format.

It is understood that the entities performing the steps illustrated in FIGS. 15-17 are logical entities that may be implemented in the form of software (i.e., computer-executable instructions) stored in a memory of, and executing on a processor of, a network node or computer system such as those illustrated in FIG. 25C or FIG. 25D. That is, the method(s) illustrated in FIGS. 15-17 may be implemented in the form of software (i.e., computer-executable instructions) stored in a memory of a network node, such as the node or computer system illustrated in FIG. 25C or FIG. 25D, which computer executable instructions, when executed by a processor of the node, perform the steps illustrated in FIGS. 15-17. The following describes modification in CoAP protocol. In order to attach the delay tolerance information into the message, we have to create new options For the Requests (GET, PUT, POST, DELETE), the delay tolerance can be indicated in "Option" field and the value is indicated in the "Option value" field as current CoAP format referring to FIG. 4. We need to add DelayIndicator as a new option with the option number, for example as 61. The corresponding value is represented by either absolute or relative time. If the DelayIndicator is a value, then only one DelayIndicator option is required. If the DelayIndicator is a range, then two DelayIndicator options are required, the value of which serve as a lower bound and upper bound.

The existing ACK only includes the 4-byte header. To include the DelayIndicator that is scheduled by the CoAP Server, ACK can add the option field just as GET Request. Apparently, if a Request has no delay requirement, the Request and ACK are normal as in existing CoAP protocol. If there is delay requirement in the Request, the corresponding ACK must support this modification by adding the new option.

Modification can be made to support aggregated messages

Assume there are three payloads for three Requests to be delivered, labelling as Payload0, Payload1 and Payload2. Apparently, the three Requests have separate Token IDs, like Token ID0, Token ID1 and Token ID2 and separate Message IDs, like Message ID0, Message ID1 and Message ID2.

Aggregated Response

In order to support multiple Responses in a single message, we have to reformat the message by embedding the additional Responses as an aggregated response.

FIG. 18 is a diagram that illustrates one embodiment of an aggregated response. Add the second and third Token ID (i.e. Token ID1 and Token ID2) in CoAP header. Each Token ID needs to have an associated TKL field (e.g. TKL1 for Token ID1, TKL2 for Token ID2).

FIG. 19 is a diagram that illustrates a second embodiment of an aggregated response. This embodiment uses two new options to contain the second payload (i.e. Payload1) and the third payload (i.e. Payload 2) respectively. Each new option includes three new fields besides "Option delta" and "Option length": TKL, Token ID, and Payload. TKL is used to recognize the Token ID and can be one byte. Token ID is associated with Payload.

FIG. 20 is a diagram that illustrates a third embodiment of an aggregated response. The embodiment contains the second and third Token ID (i.e. Token ID1 and Token ID2) in two options. Then put the second (i.e. Payload1) and third payload (i.e. Payload2) after the first payload (i.e. Payload0), which can be separated by all-one string as displayed in FIG. 20.

Similarly, in order to support aggregated acknowledgements in a single ACK message, ACK has to attach multiple Message IDs corresponding to each Request. We have two options to realize ACK aggregation.

FIG. 21 is a diagram that illustrates a first embodiment of an aggregated ACK. The embodiment puts the second or third Message ID (i.e. Message ID1 and Message ID2) into the option field and create a new option MessageID Option (e.g., option number 63), where the option value field stores the value of the Message ID.

FIG. 22 is a diagram that illustrates a second embodiment of an aggregated ACK. The embodiment puts the second or third Message ID (i.e. Message ID1 and Message ID2) after original Message ID field (i.e. Message ID0). Here we only consider a separate ACK (not piggybacked ACK) because the aggregated Response has been addressed above, thus there is no payload in the message.

To allow CoAP Client to notify Cancellation to CoAP Server, Cancel operation needs to be supported. There are three alternatives.

FIG. 23 is a diagram that illustrates an example of a cancel option. The first alternative one is to use GET (or PUT, POST) Request and add a new option "Cancel" (e.g., option number 64) to indicate CoAP Client 504 would like to cancel a previous Request sent to CoAP Server. Since all pending Requests are buffered at CoAP Server 502, the cancel Request only needs to include the Token ID of this pending Request so that CoAP Server 502 can retrieve the old Request and remove it from its cache. Token ID can be put in the Option value field as in.

The second way is to make use of DELETE Request and remove the pending Request buffered at CoAP Server 502. To achieve this, it needs the help of ACK to return the URI of the buffered pending Request as already discussed in FIG. 16. Then CoAP Client 504 puts the URI in the DELETE Request such that CoAP Server deletes the resource (pending Request) as usual. In existing CoAP, ACK does not attach URI so we need to add URI option (e.g. URI-Host, URI-Port, and/or URI-Path) in the ACK message.

The third scheme is to use RESET message. In existing CoAP, Reset message is used to inform the other side of the failure to accept or execute the Request. It only has 4-byte header as ACK. To support Cancel operation, Message ID is not sufficient for CoAP Server to retrieve the previous Request because during the time frame from a Request is issued to a Response is returned, there might be a bunch of other Requests/Responses going on and the initial message ID may have been incremented so much that the same value is in use when the Cancel message is issued. So CoAP Server 502 cannot recognize the correct Request through the duplicate message ID. Consequently, Token ID which has a larger range (0 to 8 bytes) has to be added into a RESET message after CoAP Header so that CoAP Server can retrieve the pending Request accordingly.

The last approach is to define a new "Cancel" method (e.g., the method code can be 0.05) in addition to the current four methods: GET, PUT, POST, DELETE. If a response is required, then Token ID can be attached in the option field to enable CoAP Server to retrieve the pending Request. Otherwise, Token ID can be put in the Token field rather than Option field. Whenever CoAP Server receives a CANCEL Request, it immediately understands and executes the cancellation.

Figure 24:
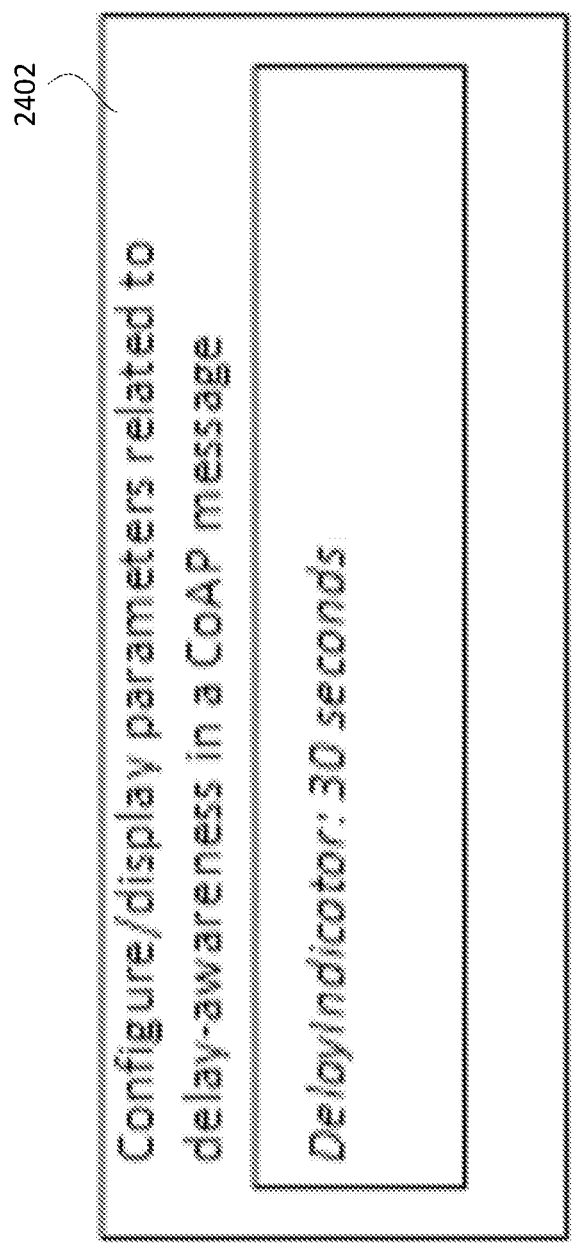
FIG. 24 is a diagram of a Graphical User Interface of one embodiment.

Interfaces, such as Graphical User Interfaces (GUIs), can be used to assist user to control and/or configure functionalities related to enabling delay-awareness in CoAP. FIG. 24 is a diagram that illustrates an interface 2402 that allows a user to view and configure delay-awareness related parameters such as a delay indicator. It is to be understood that interface 2402 can be produced using displays such as those shown in FIGS. 25C-D described below.

Example M2M/IoT/WoT Communication System

FIG. 25A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as CoAP server 502, CoAP Clients 504, 506, 508, and 510, CoAP proxy 1302 and logical entities to produce the messages of FIGS. 18-23 and logical entities to produce interface 2402.

As shown in FIG. 25A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 25B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as CoAP server 502, CoAP Clients 504, 506, 508, and 510, CoAP proxy 1302 and logical entities to produce the messages of FIGS. 18-23 and logical entities to produce interface 2402. The M2M service layer 22 may be implemented by one or more servers, computers, devices, virtual machines (e.g. cloud/storage farms, etc.) or the like, including for example the devices illustrated in FIGS. 25C and 25D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 25B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as CoAP server 502, CoAP Clients 504, 506, 508, and 510, CoAP proxy 1302 and logical entities to produce the messages of FIGS. 18-23 and logical entities to produce interface 2402 may be hosted within a M2M service layer instance hosted by an M2M node, such as an M2M server, M2M gateway, or M2M device, as shown in FIG. 25B. For example, the logical entities such as CoAP server 502, CoAP Clients 504, 506, 508, and 510, CoAP proxy 1302 and logical entities to produce the messages of FIGS. 18-23 and logical entities to produce interface 2402 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/ geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 25C or FIG. 25D described below.

Further, logical entities such as CoAP server 502, CoAP Clients 504, 506, 508, and 510, CoAP proxy 1302 and logical entities to produce the messages of FIGS. 18-23 and logical entities to produce interface 2402 can implemented as part of an M2M network that uses a Service Oriented Architecture (SOA) and/or a Resource-Oriented Architecture (ROA) to access services of the present application.

FIG. 25C is a block diagram of an example hardware/ software architecture of a M2M network node 30, such as an M2M device 18, an M2M gateway 14, an M2M server, or the like. The node 30 can execute or include logical entities such as CoAP server 502, CoAP Clients 504, 506, 508, and 510, CoAP proxy 1302 and logical entities to produce the messages of FIGS. 18-23 and logical entities to produce interface 2402. The device 30 can be part of an M2M network as shown in FIG. 25A-B or part of a non-M2M network. As shown in FIG. 25C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 25C, the processor 32 is coupled to its communication circuitry (e.g., transceiver 34 and transmit/ receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 25C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 25C as a single element, the M2M node 30 may include any number of transmit/receive elements 36.

More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 25D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as CoAP server 502, CoAP Clients 504, 506, 508, and 510, CoAP proxy 1302 and logical entities to produce the messages of FIGS. 18-23 and logical entities to produce interface 2402. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 25A and FIG. 25B, to enable the computing system 90 to communicate with other nodes of the network.

Nodes can be apparatus, devices and other elements. The nodes/apparatus/devices can include processors and memory to implement the system of the present invention. The nodes/apparatus/devices can be networked nodes/apparatus/devices used in a communication system. The nodes/apparatus/devices can be used to implement functionality of the disclosed embodiments and can include functionality and logical entities such as CoAP server 502, CoAP Clients 504, 506, 508, and 510, CoAP proxy 1302 and logical entities to produce the messages of FIGS. 18-23 and logical entities to produce interface 2402.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 25 A-B or the device 30 of FIG. 25 C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as CoAP server 502, CoAP Clients 504, 506, 508, and 510, CoAP proxy 1302 and logical entities to produce the messages of FIGS. 18-23 and logical entities to produce interface 2402 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed is:

1. An apparatus providing a server function, the apparatus comprising a processor, a memory, and communication circuitry, the apparatus being configured to connect to a communications network via its communication circuitry, the apparatus further comprising computer-executable instructions stored in the memory which, when executed by the processor, cause the apparatus to:
   receive, from a client, a first request, the first request pertaining to accessing a first resource hosted by the apparatus, the first request comprising a first delay indicator for request (DIFQ), the first DIFQ indicating a delay tolerance of the client for the first request;
   process the first request according to the client, the first DIFQ, and the first resource hosted by the apparatus;
   determine, based on the processing of the first request and the first DIFQ, a first delay indicator for acknowledgement (DIFA), the first DIFA indicating a minimum period before responding to the first request;
   send, to the client and based on the processing of the first request, an acknowledgement, the acknowledgement comprising the first DIFA;
   receive, from the client, a second request, the second request pertaining to accessing a second resource hosted by the apparatus, the second request comprising a second DIFQ, the second DIFQ indicating a delay tolerance of the client for the second request;
   process the second request according to the client, the second DIFQ, and the second resource hosted by the apparatus;
   determine, based on the processing of the second request and the second DIFQ, a second first delay indicator for acknowledgement (DIFA), the second DIFA indicating a minimum period before responding to the second request;
   send, to the client and based on the processing of the second request, an acknowledgement, the acknowledgement comprising the second DIFA; and
   send, to the client and based on the processing of the first request and the second request, an aggregated response, the aggregated response comprising access results of the first resource and the second resource, the aggregated response further comprising a delay indicator for response (DIFP), the DIFP indicating an actual delay in sending the first response.

2. The apparatus of claim 1, wherein the DIFP reflects an actual delay, an expected delay, or an historical delay.

3. The apparatus of claim 2, wherein the aggregated response comprises a time stamp.

4. The apparatus of claim 2, wherein the first DIFP comprises an absolute time reference.

5. The apparatus of claim 2, wherein the first DIFP comprises a relative time reference.

6. The apparatus of claim 2, wherein the client is a Constrained Application Protocol (CoAP) client and the apparatus is a CoAP server.

7. The apparatus of claim 1, wherein the first DIFQ reflects an actual delay, an expected delay, or an historical delay.

8. The apparatus of claim 7, wherein the first request comprises a time stamp.

9. The apparatus of claim 7, wherein the first DIFQ comprises an absolute time reference.

10. The apparatus of claim 7, wherein the first DIFQ comprises a relative time reference.

11. An apparatus providing a client function, the apparatus comprising a processor, a memory, and communication circuitry, the apparatus being configured to connect to a communications network via its communication circuitry, the apparatus further comprising computer-executable instructions stored in the memory which, when executed by the processor, cause the apparatus to:
   send, to a server, a first request, the first request pertaining to accessing a first resource hosted by the server, the first request comprising a first delay indicator for request (DIFQ), the first DIFQ indicating a delay tolerance of the apparatus for the first request;
   receive, from the server, an acknowledgement comprising a first delay indicator for acknowledgement (DIFA), the first DIFA indicating a minimum period before the server will send a response pertaining to the first request, the first DIFA being based on the first DIFQ and on processing by the server of the first request;
   send, to a server, a second request, the second request pertaining to accessing a second resource hosted by the server, the second request comprising a second DIFQ, the second DIFQ indicating a delay tolerance of the apparatus for the second request;
   receive, from the server, an acknowledgement comprising a second DIFA, the second DIFA indicating a minimum period before the server will send a response pertaining to the second request, the second DIFA being based on the second DIFQ and on processing by the server of the second request;
   receive, from the server, an aggregated response, the aggregated response pertaining to the first request and the second request, the aggregated response comprising a delay indicator for response (DIFP), the DIFP indicating an actual delay in sending the response; and
   send, to the server according to the DIFP, a third request, the third request pertaining to accessing the resource hosted by the server.

12. The apparatus of claim 11, wherein the DIFP reflects an actual delay, an expected delay, or an historical delay.

13. The apparatus of claim 12, wherein the aggregated response comprises a time stamp.

14. The apparatus of claim 12, wherein the DIFP comprises an absolute time reference.

15. The apparatus of claim 12, wherein the DIFP comprises a relative time reference.

16. The apparatus of claim 12, wherein the apparatus is a Constrained Application Protocol (CoAP) client and the server is a CoAP server.

17. The apparatus of claim 11, wherein the instructions further cause the apparatus to determine to sleep for a period based at least in part on the DIFP, and sleep for the period prior to sending the third request.

18. The apparatus of claim 11, wherein the first DIFQ reflects an actual delay, an expected delay, or an historical delay.

19. The apparatus of claim 18, wherein the first request comprises a time stamp.

20. The apparatus of claim 18, wherein the first DIFQ comprises an absolute time reference.

* * * * *